（12） United States Patent
Linsky et al.

(10) Patent No.: US 9,161,232 B2
(45) Date of Patent: Oct. 13, 2015

(54) DECENTRALIZED COEXISTENCE MANAGER FOR CONTROLLING OPERATION OF MULTIPLE RADIOS

(75) Inventors: Joel B. Linsky, San Diego, CA (US); Tamer A. Kadous, San Diego, CA (US); Ashok Mantravadi, San Diego, CA (US); Richard Wietfeldt, San Diego, CA (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1092 days.

(21) Appl. No.: 12/626,454

(22) Filed: Nov. 25, 2009

(65) Prior Publication Data
US 2010/0331029 A1 Dec. 30, 2010

Related U.S. Application Data

(60) Provisional application No. 61/221,287, filed on Jun. 29, 2009.

(51) Int. Cl.
*H04B 7/00* (2006.01)
*H04W 16/14* (2009.01)
(Continued)

(52) U.S. Cl.
CPC .............. *H04W 16/14* (2013.01); *H04W 88/06* (2013.01); *H04W 88/10* (2013.01)

(58) Field of Classification Search
CPC . H04J 11/0026; H04J 11/0023; H04W 72/08; H04W 72/082; H04W 28/04; H04W 28/048; H04W 52/243
USPC ............. 455/500, 552.1, 550.1, 412.1, 412.2, 455/551, 517, 426.1, 426.2, 422.1, 403, 455/445, 414.1–414.4, 67.11, 41.1, 41.2; 370/328, 329, 343, 338, 310
See application file for complete search history.

(56) References Cited

U.S. PATENT DOCUMENTS 4,933,845 A 6/1990 Hayes
5,486,210 A 1/1996 Kerr et al.
(Continued)

FOREIGN PATENT DOCUMENTS

CN 1449601 A 10/2003
CN 1475064 A 2/2004
(Continued)

OTHER PUBLICATIONS

International Search Report and Written Opinion—PCT/US2010/040439, International Search Authority—European Patent Office—Dec. 8, 2010.
(Continued)

*Primary Examiner* — Keith Ferguson
(74) *Attorney, Agent, or Firm* — Rupit M. Patel

(57) ABSTRACT

Systems and methodologies are described herein that facilitate a decentralized structure for managing multi-radio coexistence for a mobile device and/or other suitable device(s). As described herein, a coexistence manager (CxM) and/or other suitable means can be implemented in connection with a set of radios (or other transceivers) in order to manage conflicts between events corresponding to the radios. Functionality can be divided such that the CxM operates on the control plane and handles configuration and long-term operations such as registration, sleep mode management, interaction with upper layers, etc., while the respective radios operate on the data plane and handle short-term radio event management operations based on incoming notifications or event requests. For instance, radios can identify conflicts between requested external events and internally associated events and accordingly provide responses that allow or disallow the external events on an absolute basis or a conditional basis (e.g., based on proposed event modifications).

26 Claims, 13 Drawing Sheets

(51) Int. Cl.
  *H04W 88/06*  (2009.01)
  *H04W 88/10*  (2009.01)

(56) References Cited

U.S. PATENT DOCUMENTS

| | | | |
|---|---|---|---|
| 5,726,893 A | 3/1998 | Schuchman et al. | |
| 6,128,483 A | 10/2000 | Doiron et al. | |
| 6,571,285 B1 | 5/2003 | Groath et al. | |
| 6,944,430 B2 | 9/2005 | Berstis | |
| 7,035,314 B1 | 4/2006 | Linsky | |
| 7,317,900 B1 | 1/2008 | Linde et al. | |
| 7,324,815 B2 | 1/2008 | Ross et al. | |
| 7,339,446 B2 | 3/2008 | Su et al. | |
| 7,412,250 B2 | 8/2008 | Fukuda | |
| 7,433,970 B1 | 10/2008 | Euler et al. | |
| 7,440,728 B2 | 10/2008 | Abhishek et al. | |
| 7,454,171 B2 | 11/2008 | Palin et al. | |
| 7,623,879 B2 | 11/2009 | Honkanen et al. | |
| 7,685,325 B2 | 3/2010 | Batchelor et al. | |
| 7,786,755 B2 | 8/2010 | Yao et al. | |
| 7,903,642 B2 | 3/2011 | Voutilainen et al. | |
| 7,929,432 B2 | 4/2011 | Zhu et al. | |
| 7,990,882 B1 | 8/2011 | Bedair et al. | |
| 7,990,992 B2 | 8/2011 | Muukki et al. | |
| 8,059,553 B2 | 11/2011 | Leung et al. | |
| 8,060,085 B2 | 11/2011 | Goulder et al. | |
| 8,095,176 B2 | 1/2012 | Sudak | |
| 8,184,154 B2 | 5/2012 | Estevez et al. | |
| 8,340,706 B2 | 12/2012 | Zetterman et al. | |
| 8,660,548 B1 | 2/2014 | Lambert | |
| 2002/0080728 A1 | 6/2002 | Sugar et al. | |
| 2002/0129184 A1 | 9/2002 | Watanabe | |
| 2002/0167963 A1 | 11/2002 | Joa-Ng | |
| 2003/0135675 A1 | 7/2003 | Pontius et al. | |
| 2003/0139136 A1 | 7/2003 | Pattabiraman | |
| 2003/0231741 A1 | 12/2003 | Rancu et al. | |
| 2004/0022210 A1 | 2/2004 | Frank et al. | |
| 2004/0023674 A1 | 2/2004 | Miller | |
| 2004/0028003 A1 | 2/2004 | Diener et al. | |
| 2004/0028123 A1 | 2/2004 | Sugar et al. | |
| 2004/0029619 A1 | 2/2004 | Liang et al. | |
| 2004/0052272 A1 | 3/2004 | Frank | |
| 2004/0137915 A1 | 7/2004 | Diener et al. | |
| 2004/0192222 A1 | 9/2004 | Vaisanen et al. | |
| 2004/0259589 A1 | 12/2004 | Bahl et al. | |
| 2005/0047038 A1 | 3/2005 | Nakajima et al. | |
| 2005/0099943 A1 | 5/2005 | Naghian et al. | |
| 2005/0239497 A1 | 10/2005 | Bahl et al. | |
| 2005/0277387 A1 | 12/2005 | Kojima et al. | |
| 2005/0289092 A1 | 12/2005 | Sumner et al. | |
| 2006/0013176 A1 | 1/2006 | De Vos et al. | |
| 2006/0025181 A1 | 2/2006 | Kalofonos et al. | |
| 2006/0026051 A1 | 2/2006 | Rose | |
| 2006/0089119 A1 | 4/2006 | Lipasti et al. | |
| 2006/0101033 A1 | 5/2006 | Hu et al. | |
| 2006/0126702 A1 | 6/2006 | Burdett | |
| 2006/0152335 A1 | 7/2006 | Helgeson | |
| 2006/0160563 A1 | 7/2006 | Ku | |
| 2006/0166628 A1 | 7/2006 | Anttila | |
| 2006/0233191 A1 | 10/2006 | Pirzada | |
| 2006/0292986 A1 | 12/2006 | Bitran et al. | |
| 2007/0105548 A1 | 5/2007 | Mohan et al. | |
| 2007/0124005 A1 | 5/2007 | Bourakov et al. | |
| 2007/0125162 A1 | 6/2007 | Ghazi et al. | |
| 2007/0135162 A1* | 6/2007 | Banerjea et al. | 455/556.1 |
| 2007/0153702 A1 | 7/2007 | Khan et al. | |
| 2007/0165754 A1 | 7/2007 | Kiukkonen et al. | |
| 2007/0206631 A1 | 9/2007 | Parts et al. | |
| 2007/0232349 A1 | 10/2007 | Jones et al. | |
| 2007/0248114 A1 | 10/2007 | Jia et al. | |
| 2007/0255850 A1 | 11/2007 | Gould et al. | |
| 2007/0281617 A1 | 12/2007 | Meylan et al. | |
| 2008/0019339 A1 | 1/2008 | Raju et al. | |
| 2008/0045152 A1 | 2/2008 | Boes | |
| 2008/0057910 A1 | 3/2008 | Thoresson et al. | |
| 2008/0066019 A1 | 3/2008 | Worek et al. | |
| 2008/0109581 A1 | 5/2008 | Pham et al. | |
| 2008/0130580 A1 | 6/2008 | Chaponniere et al. | |
| 2008/0161041 A1 | 7/2008 | Pernu | |
| 2008/0192806 A1 | 8/2008 | Wyper et al. | |
| 2008/0200120 A1 | 8/2008 | Ruuska et al. | |
| 2008/0227456 A1 | 9/2008 | Huang et al. | |
| 2008/0232339 A1 | 9/2008 | Yang et al. | |
| 2008/0254745 A1 | 10/2008 | Zhang et al. | |
| 2008/0279137 A1 | 11/2008 | Pernu et al. | |
| 2008/0279155 A1 | 11/2008 | Pratt, Jr. et al. | |
| 2008/0287158 A1 | 11/2008 | Rayzman et al. | |
| 2008/0298643 A1 | 12/2008 | Lawther et al. | |
| 2008/0311912 A1 | 12/2008 | Balasubramanian et al. | |
| 2009/0033550 A1 | 2/2009 | Wolf | |
| 2009/0040937 A1 | 2/2009 | Xhafa et al. | |
| 2009/0046625 A1 | 2/2009 | Diener et al. | |
| 2009/0061781 A1 | 3/2009 | Zhang | |
| 2009/0116437 A1 | 5/2009 | Alexandre et al. | |
| 2009/0116573 A1 | 5/2009 | Gaal et al. | |
| 2009/0137206 A1 | 5/2009 | Sherman et al. | |
| 2009/0149135 A1 | 6/2009 | Mangold et al. | |
| 2009/0176454 A1 | 7/2009 | Chen et al. | |
| 2009/0180451 A1* | 7/2009 | Alpert et al. | 370/338 |
| 2009/0196210 A1 | 8/2009 | Desai | |
| 2009/0215404 A1 | 8/2009 | Kesavan et al. | |
| 2009/0239471 A1 | 9/2009 | Tran et al. | |
| 2009/0252053 A1 | 10/2009 | Leith et al. | |
| 2009/0252128 A1 | 10/2009 | Yang et al. | |
| 2009/0257380 A1 | 10/2009 | Meier | |
| 2009/0262785 A1 | 10/2009 | Wilhelmsson | |
| 2009/0303975 A1 | 12/2009 | Xhafa et al. | |
| 2009/0310501 A1 | 12/2009 | Catovic et al. | |
| 2009/0310661 A1 | 12/2009 | Kloper et al. | |
| 2009/0323652 A1 | 12/2009 | Chen et al. | |
| 2010/0085951 A1 | 4/2010 | Pernu et al. | |
| 2010/0130129 A1 | 5/2010 | Chang et al. | |
| 2010/0137025 A1* | 6/2010 | Tal et al. | 455/553.1 |
| 2010/0141399 A1 | 6/2010 | Swope | |
| 2010/0142500 A1 | 6/2010 | Sudak | |
| 2010/0153760 A1 | 6/2010 | Gupta et al. | |
| 2010/0158037 A1 | 6/2010 | Heinke et al. | |
| 2010/0197235 A1 | 8/2010 | Wilhelmsson | |
| 2010/0203832 A1 | 8/2010 | Russell et al. | |
| 2010/0241727 A1 | 9/2010 | Bourakov et al. | |
| 2010/0273426 A1 | 10/2010 | Walley et al. | |
| 2010/0273504 A1 | 10/2010 | Bull et al. | |
| 2010/0304685 A1 | 12/2010 | Wietfeldt et al. | |
| 2010/0304770 A1 | 12/2010 | Wietfeldt et al. | |
| 2010/0311455 A1 | 12/2010 | Armstrong et al. | |
| 2010/0316027 A1 | 12/2010 | Rick et al. | |
| 2010/0322287 A1* | 12/2010 | Truong et al. | 375/133 |
| 2010/0329105 A1 | 12/2010 | Ylanen et al. | |
| 2010/0329162 A1 | 12/2010 | Kadous et al. | |
| 2010/0330977 A1 | 12/2010 | Kadous et al. | |
| 2011/0007680 A1 | 1/2011 | Kadous et al. | |
| 2011/0007688 A1 | 1/2011 | Veeravalli et al. | |
| 2011/0009136 A1 | 1/2011 | Mantravadi et al. | |
| 2011/0026432 A1 | 2/2011 | Gruber et al. | |
| 2011/0026458 A1 | 2/2011 | Gruber et al. | |
| 2011/0065402 A1 | 3/2011 | Kraft et al. | |
| 2011/0105027 A1 | 5/2011 | Linsky | |
| 2011/0116490 A1 | 5/2011 | Wilhelmsson et al. | |
| 2011/0199989 A1 | 8/2011 | Wietfeldt et al. | |
| 2011/0212288 A1 | 9/2011 | McClure et al. | |
| 2011/0249603 A1 | 10/2011 | Rick et al. | |
| 2011/0312288 A1 | 12/2011 | Fu et al. | |
| 2012/0034870 A9 | 2/2012 | Desai et al. | |
| 2012/0129457 A1 | 5/2012 | Linsky | |
| 2012/0213303 A1 | 8/2012 | Kadous et al. | |
| 2012/0230303 A1 | 9/2012 | Guo et al. | |
| 2012/0270595 A1 | 10/2012 | Yang et al. | |

FOREIGN PATENT DOCUMENTS

| | | | |
|---|---|---|---|
| CN | 1592088 A | 3/2005 | |
| CN | 1666189 A | 9/2005 | |
| CN | 1689194 A | 10/2005 | |
| CN | 1716900 A | 1/2006 | |

(56) References Cited

FOREIGN PATENT DOCUMENTS

| | | |
|---|---|---|
| CN | 1741484 A | 3/2006 |
| CN | 1887018 A | 12/2006 |
| CN | 1893299 A | 1/2007 |
| CN | 101132368 A | 2/2008 |
| CN | 101170315 A | 4/2008 |
| CN | 101262254 A | 9/2008 |
| CN | 101361279 A | 2/2009 |
| CN | 101378355 A | 3/2009 |
| CN | 101453759 A | 6/2009 |
| DE | 19602535 C1 | 9/1996 |
| EP | 1220460 A2 | 7/2002 |
| EP | 1489788 A2 | 12/2004 |
| EP | 1551080 A1 | 7/2005 |
| EP | 1589781 | 10/2005 |
| EP | 1659814 A1 | 5/2006 |
| EP | 1681772 A1 | 7/2006 |
| EP | 1703675 A1 | 9/2006 |
| EP | 1705936 | 9/2006 |
| EP | 1729464 A1 | 12/2006 |
| EP | 1959619 | 8/2008 |
| EP | 2068452 | 6/2009 |
| GB | 2412817 A | 10/2005 |
| JP | 561110250 A | 5/1986 |
| JP | H05336141 A | 12/1993 |
| JP | H0721114 A | 1/1995 |
| JP | 08055495 | 2/1996 |
| JP | 9501814 A | 2/1997 |
| JP | 2003199160 A | 7/2003 |
| JP | 2003234745 A | 8/2003 |
| JP | 2003298598 A | 10/2003 |
| JP | 2004129143 A | 4/2004 |
| JP | 2005012815 A | 1/2005 |
| JP | 2005529549 A | 9/2005 |
| JP | 2005328520 A | 11/2005 |
| JP | 2006211242 A | 8/2006 |
| JP | 2007503733 A | 2/2007 |
| JP | 2007129711 A | 5/2007 |
| JP | 2007202176 A | 8/2007 |
| JP | 2007523519 A | 8/2007 |
| JP | 2008521309 A | 6/2008 |
| JP | 2008153984 A | 7/2008 |
| JP | 2008219444 A | 9/2008 |
| JP | 2009500988 A | 1/2009 |
| JP | 2009042887 A | 2/2009 |
| JP | 2009534972 A | 9/2009 |
| JP | 2010504677 A | 2/2010 |
| JP | 2010531565 A | 9/2010 |
| KR | 20040111157 A | 12/2004 |
| KR | 20060047429 A | 5/2006 |
| TW | 1264209 B | 10/2006 |
| TW | 200820800 A | 5/2008 |
| TW | 1309953 B | 5/2009 |
| WO | WO9422239 | 9/1994 |
| WO | 9527381 A1 | 10/1995 |
| WO | WO0230133 A2 | 4/2002 |
| WO | WO03105418 | 12/2003 |
| WO | WO2004006461 A1 | 1/2004 |
| WO | WO-2005062815 A2 | 7/2005 |
| WO | WO2007008981 | 1/2007 |
| WO | 2007063901 A1 | 6/2007 |
| WO | WO-2007083205 A2 | 7/2007 |
| WO | 2007122297 A1 | 11/2007 |
| WO | WO2007138375 | 12/2007 |
| WO | WO2008000905 | 1/2008 |
| WO | 2008024713 A2 | 2/2008 |
| WO | WO-2008041071 A2 | 4/2008 |
| WO | WO2008070777 | 6/2008 |
| WO | WO2010080669 | 7/2010 |
| WO | WO2011002795 A1 | 1/2011 |
| WO | WO2011006130 A1 | 1/2011 |
| WO | WO2011008557 A1 | 1/2011 |
| WO | WO2011061164 A2 | 5/2011 |

OTHER PUBLICATIONS

Baghel, et al., "Coexistence Possibilities of LTE with ISM Technologies and GNSS," IEEE, 2011 International Conference on Communications, Jan. 28-30, 2011. p. 1-5.

Bluetooth SIG, Inc. "Bluetooth Specification Version 3.0 + HS, Core System Package, Part B Baseband Specification", vol. 2 Apr. 21, 2009, pp. 68-85, XP002622397, Retrieved from the Internet: URL: http://www.bluetooth.com/Specification_%20Documents/Core_V30_HS.zip.

Coen Bron, et al., Algorithm 457: Finding All Cliques of an Undirected Graph, Communications of the ACM, 16(9): 575-577, 1973.

dB or not dB? Everything you ever wanted to know about decibels but were afraid to ask . . . Application Note 1 MA98, Oct. 2005, Rohde & Schwarz, located at http:||www2.rohde-schwarz.com|file~561311M A98-4E.

F. Cazals, C. Karande, A note on the problem of reporting maximal cliques, Theoretical Computer Science, vol. 407, Issues 1-3, Nov. 6, 2008, pp. 564-568.

Hong, et al., "Exploring multiple radios and multiple channels in wireless mesh networks [Accepted from Open Call]", IEEE Wireless Communications, IEEE Service Center, Piscataway, NJ, US, vol. 17, No. 3, Jun. 1, 2010, pp. 76-85, XP01131181, ISSN: 1536-1284.

Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

Ramachandran, at al., "Interference-Aware Channel Assignement in Multi-Radio Wireless Mesh Networks", INFOCOM 2006, 25th IEEE International Conference on Computer Communications, Proceedings, IEEE Piscataway, NJ. Apr. 1, 2006, pp. 1-12, XP031072217, DO1: 10.1109/INFOCOM.2006.177, ISBN: 978-1-4244-0221-2.

Stefan Geirhofer, et al., "Cognitive frequency hopping based on interference prediction: theory and experimental results" Mobile Computing and Communications Review, ACM, New York, NY, US LNKD-DOI: 10.1146/1621076.1621082, vol. 13, No. 2, Apr. 1, 2009, pp. 49-61, XP001555779, ISSN: 1091-1669.

Stefan, G., et al., "Congnitive Frequency Hopping Based on Interference Prediction: Theory and Experimental Results", Mobile Computing and Communications Review, vol. 13, No. 2, pp. 49 to 51, Apr. 2009.

Taiwan Search Report—TW099121272—TIPO—Apr. 21, 2013.
Taiwan Search Report—TW099121272—TIPO—May 20, 2013.

* cited by examiner

DECENTRALIZED COEXISTENCE MANAGER FOR CONTROLLING OPERATION OF MULTIPLE RADIOS

CROSS-REFERENCE

This application claims the benefit of U.S. Provisional Application Ser. No. 61/221,287, filed Jun. 29, 2009, and entitled "DECENTRALIZED COEXISTENCE MANAGER FOR CONTROLLING OPERATION OF MULTIPLE RADIOS," the entirety of which is incorporated herein by reference.

BACKGROUND

I. Field

The present disclosure relates generally to wireless communications, and more specifically to managing coexistence between multiple radios utilized by respective devices in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and Single-Carrier FDMA (SC-FDMA) systems.

Generally, a wireless multiple-access communication system can include a number of radios to support communication with different wireless communication systems. Respective radios can operate on certain frequency channels or bands or can have respective predefined requirements. In order to manage communication via multiple radios and avoid collisions and/or interference between respective radios, it would be desirable to implement mechanisms to coordinate between respective radios that are in collision (e.g., radios configured such that their mutual operation would cause significant interference on at least one of the radios).

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying one or more associated transceivers; determining respective properties of the associated transceivers; and generating one or more configuration parameters to be utilized by respective associated transceivers in connection with management of events associated with the respective associated transceivers based on notifications provided between associated transceivers.

A second aspect described herein relates to a wireless communications apparatus, which can comprise a memory that stores data relating to one or more associated radios. The wireless communications apparatus can further comprise a processor configured to determine respective properties of the associated radios, to generate one or more configuration parameters based at least in part on the respective properties of the associated radios, and to provide the configuration parameters to the associated radios in connection with management of events corresponding to the associated radios based on notifications provided between the associated radios.

A third aspect relates to an apparatus, which can comprise means for obtaining information relating to properties of one or more associated transceivers and means for generating configuration parameters to be utilized by the one or more associated transceivers for event management based at least in part on the properties of the one or more associated transceivers.

A fourth aspect described herein relates to a computer program product, which can include a computer-readable medium that comprises code for causing a computer to obtain information relating to properties of one or more associated radios and code for causing a computer to generate configuration parameters to be utilized by the one or more associated radios for multi-radio event management based at least in part on the properties of the one or more associated radios.

According to a fifth aspect, a method is described herein. The method can comprise identifying a set of internal events and one or more configuration parameters; receiving notifications of respective external events from one or more associated transceivers; determining whether the respective external events conflict with one or more identified internal events based at least in part on the one or more configuration parameters; and transmitting respective responses to the one or more associated transceivers according to a result of the determining.

A sixth aspect described herein relates to a wireless communications apparatus, which can comprise a memory that stores data relating to one or more associated radios, a set of internal events, and one or more configuration parameters. The wireless communications apparatus can further comprise a processor configured to receive notifications of respective external events from respective associated radios, to conduct a determination relating to whether the respective external events conflict with one or more identified internal events based at least in part on the one or more configuration parameters, and to transmit respective responses to the respective associated radios according to the determination.

A seventh aspect relates to an apparatus, which can comprise means for identifying respective internal events and a requested external event; means for conducting a determination relating to whether the requested external event conflicts with at least one identified internal event; and means for providing a response that selectively allows or disallows the requested external event based at least in part on the determination.

An eighth aspect described herein relates to a computer program product, which can include a computer-readable medium that comprises code for causing a computer to identify respective internal events and a requested external event; code for conduct a determination relating to whether the requested external event conflicts with at least one identified internal event; and code for causing a computer to provide a response that selectively allows or disallows the requested external event based at least in part on the determination.

A ninth aspect described herein relates to a system operable in a wireless communication system. The system can comprise a set of transceivers and a coexistence manager (CxM) control module that performs an analysis for the set of transceivers and generates a set of coexistence configuration parameters according to the analysis, wherein the set of transceivers identifies event request messages for respective external events, conducts determinations relating to whether the respective external events can be executed concurrently with respective associated internal events based at least in part on the set of coexistence configuration parameters, and provides responses that selectively allow or disallow the respective external events according to the determinations.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
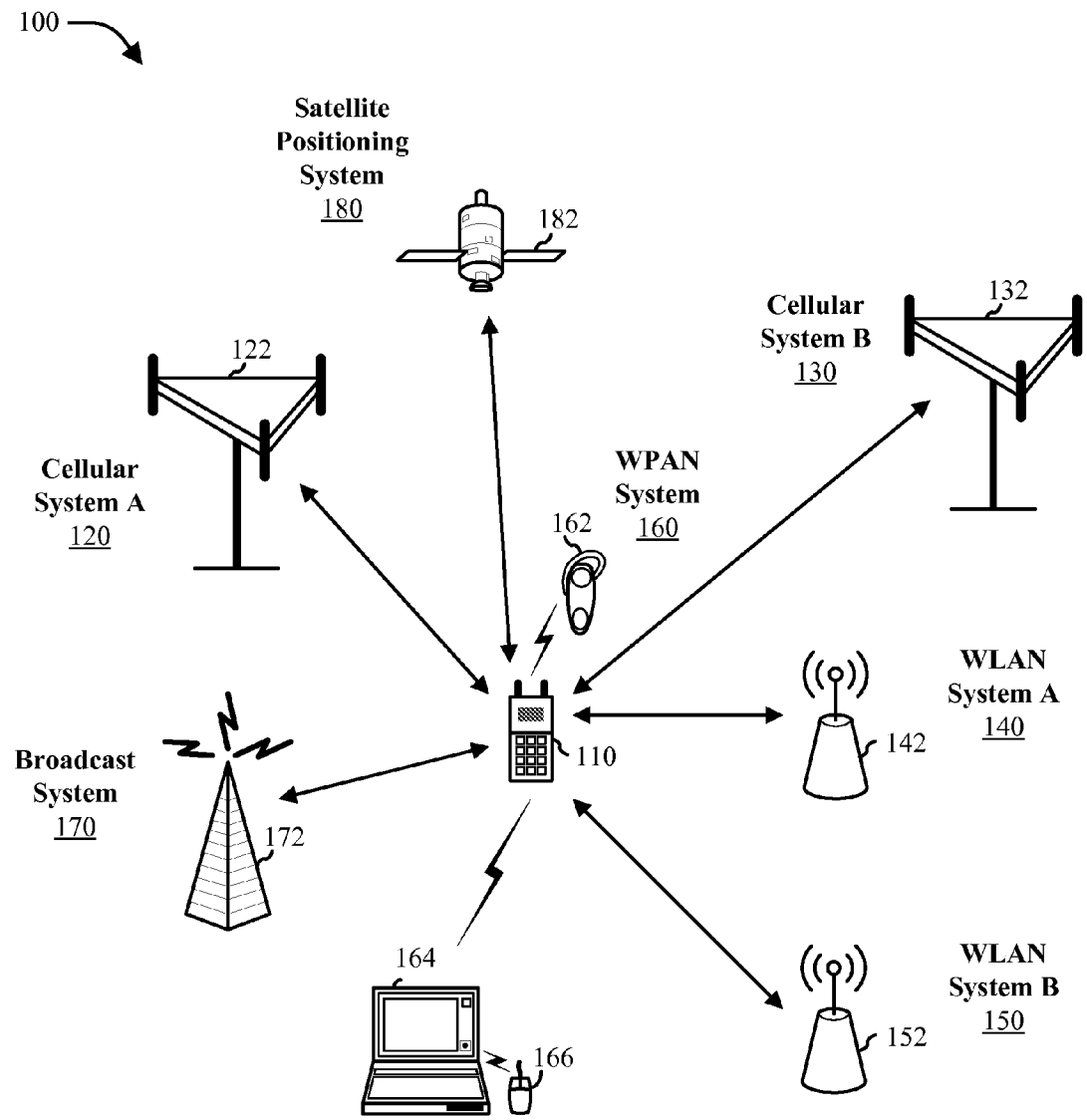
FIG. 1 is a block diagram of an example wireless communication environment in which various aspects described herein can function.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, it can be appreciated that various illustrative logical blocks, modules, circuits, algorithm steps, etc., described in connection with the disclosure herein can be implemented as electronic hardware, computer software, or combinations of both. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the disclosure herein can additionally or alternatively be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, or alternatively the processor can be any conventional processor, controller, microcontroller, state machine, or the like. A processor can also be implemented as a combination of computing devices, e.g., a combination of a DSP and a microprocessor, a plurality of microprocessors, one or more microprocessors in conjunction with a DSP core, or any other such configuration.

Furthermore, various functions of one or more example embodiments described herein can be implemented in hardware, software, firmware, or any combination thereof If implemented in software, the functions can be stored on or transmitted as one or more instructions or code on a computer-readable medium. Computer-readable media can include both computer storage media and communication media. Communication media can include any medium that facilitates transfer of a computer program from one place to another. Likewise, storage media can include any available media that can be accessed by a general purpose or special purpose computer. By way of example, and not limitation, computer-readable media can comprise RAM, ROM, EEPROM, CD-ROM, digital versatile disc (DVD), blu-ray disc, or other optical disk storage, magnetic disk storage or other magnetic storage devices, and/or any other medium that can be used to carry or store desired program code means in the form of instructions or data structures and that can be accessed by a general-purpose or special-purpose computer or a general-purpose or special-purpose processor. Further, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and/or microwave, then such means are intended to be included in the definition of medium. "Disk" and "disc," as used herein, includes compact disc (CD), laser disc, optical disc, DVD, floppy disk, and blu-ray disc, where "disks" generally reproduce data magnetically while "discs" reproduce data optically (e.g., with lasers). Combinations of the above can also be included within the scope of computer-readable media.

Referring now to the drawings, FIG. 1 illustrates an example wireless communication environment 100 in which various aspects described herein can function. Wireless communication environment 100 can include a wireless device 110, which can be capable of communicating with multiple communication systems. These systems can include, for example, one or more cellular systems 120 and/or 130, one or more wireless local area network (WLAN) systems 140 and/or 150, one or more wireless personal area network (WPAN) systems 160, one or more broadcast systems 170, one or more satellite positioning systems 180, other systems not shown in FIG. 1, or any combination thereof It should be appreciated that in the following description the terms "network" and "system" are often used interchangeably.

Cellular systems 120 and 130 can each be a CDMA, TDMA, FDMA, OFDMA, SC-FDMA, or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, cellular system 120 can include a number of base stations 122, which can support bi-directional communication for wireless devices within their coverage. Similarly, cellular system 130 can include a number of base stations 132 that can support bi-directional communication for wireless devices within their coverage.

WLAN systems 140 and 150 can respectively implement radio technologies such as IEEE 802.11 (Wi-Fi), Hiperlan, etc. WLAN system 140 can include one or more access points 142 that can support bi-directional communication. Similarly, WLAN system 150 can include one or more access points 152 that can support bi-directional communication. WPAN system 160 can implement a radio technology such as IEEE 802.15.1 (Bluetooth), IEEE 802.15.4 (Zigbee), etc. Further, WPAN system 160 can support bi-directional communication for various devices such as wireless device 110, a headset 162, a computer 164, a mouse 166, or the like.

Broadcast system 170 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, broadcast system 170 can include one or more broadcast stations 172 that can support one-way communication.

Satellite positioning system 180 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, satellite positioning system 180 can include a number of satellites 182 that transmit signals used for position determination.

In an aspect, wireless device 110 can be stationary or mobile and can also be referred to as a user equipment (UE), a mobile station, a mobile equipment, a terminal, an access terminal, a subscriber unit, a station, etc. Wireless device 110 can be a cellular phone, a personal digital assistant (PDA), a wireless modem, a handheld device, a laptop computer, a cordless phone, a wireless local loop (WLL) station, etc. In addition, wireless device 110 can engage in two-way communication with cellular system 120 and/or 130, WLAN system 140 and/or 150, devices within WPAN system 160, and/or any other suitable system(s) and/or device(s). Wireless device 110 can additionally or alternatively receive signals from broadcast system 170 and/or satellite positioning system 180. In general, it can be appreciated that wireless device 110 can communicate with any number of systems at any given moment.

Figure 2:
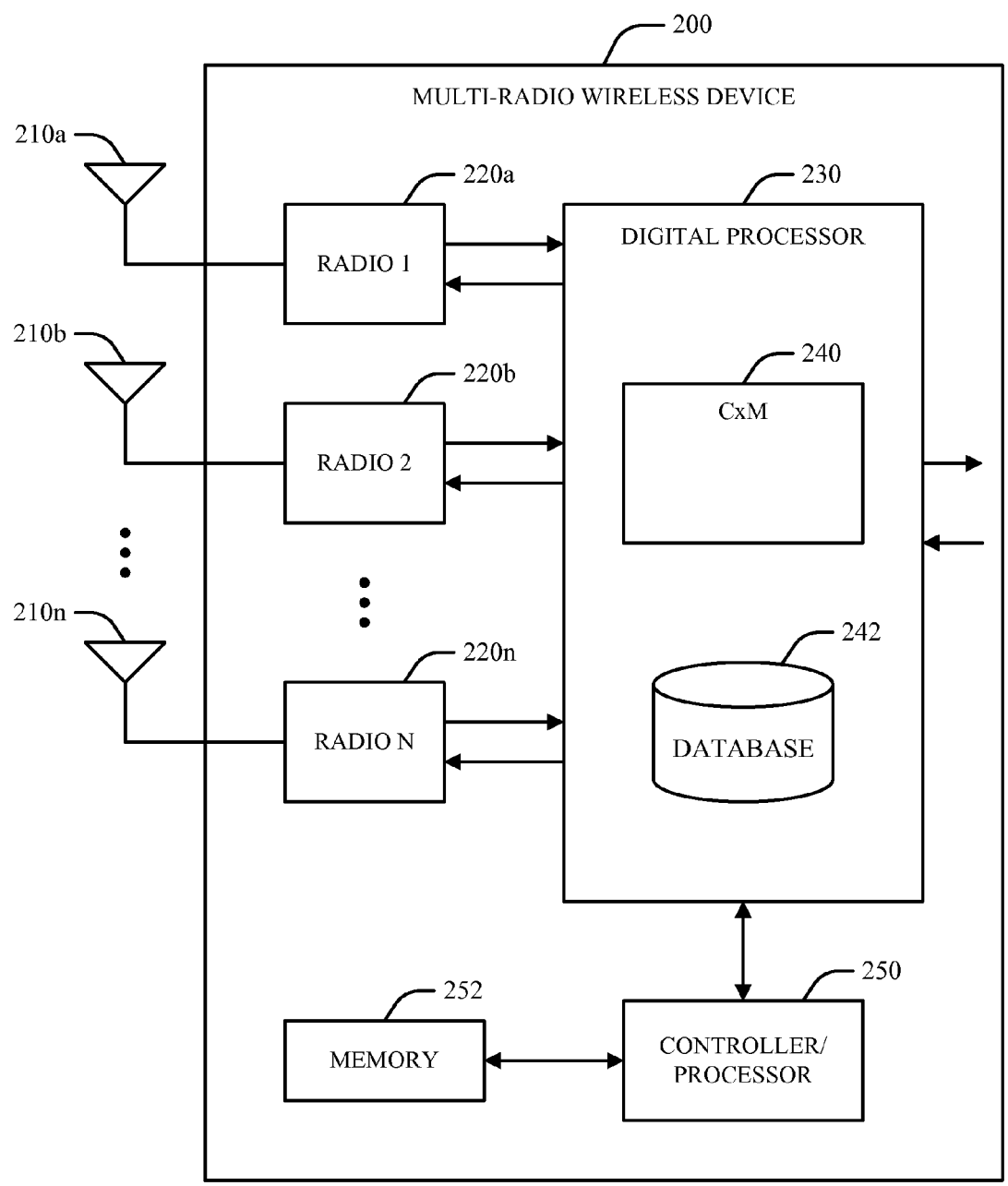
FIG. 2 is a block diagram of an example wireless device that can be operable to manage coexistence between respective radios in an associated wireless communication system in accordance with various aspects.

Turning next to FIG. 2, a block diagram is provided that illustrates an example design for a multi-radio wireless device 200. As FIG. 2 illustrates, wireless device 200 can include N radios 220a through 220n, which can be coupled to N antennas 210a through 210n, respectively, where N can be any integer value. It should be appreciated, however, that respective radios 220 can be coupled to any number of antennas 210 and that multiple radios 220 can also share a given antenna 210.

In general, a radio 220 can be a unit that radiates or emits energy in an electromagnetic spectrum, receives energy in an electromagnetic spectrum, or generates energy that propagates via conductive means. By way of example, a radio 220 can be a unit that transmits a signal to a system or a device or a unit that receives signals from a system or device. Accordingly, it can be appreciated that a radio 220 can be utilized to support wireless communication. In another example, a radio 220 can also be a unit (e.g., a screen on a computer, a circuit board, etc.) that emits noise, which can impact the performance of other radios. Accordingly, it can be further appreciated that a radio 220 can also be a unit that emits noise and interference without supporting wireless communication.

In accordance with one aspect, respective radios 220 can support communication with one or more systems. Multiple radios 220 can additionally or alternatively be used for a given system, e.g., to transmit or receive on different frequency bands (e.g., cellular and PCS bands).

In accordance with another aspect, a digital processor 230 can be coupled to radios 220a through 220n and can perform various functions, such as processing for data being transmitted or received via radios 220. The processing for each radio 220 can be dependent on the radio technology supported by that radio and can include encryption, encoding, modulation, etc., for a transmitter; demodulation, decoding, decryption, etc., for a receiver, or the like. In one example, digital processor 230 can include a coexistence manager (CxM) 240 that can control the operation of radios 220 in order to improve the performance of wireless device 200 as generally described herein. CxM 240 can have access to a database 242, which can store information used to control the operation of radios 220.

For simplicity, digital processor 230 is shown in FIG. 2 as a single processor. However, it should be appreciated that digital processor 230 can comprise any number of processors, controllers, memories, etc. In one example, a controller/processor 250 can direct the operation of various units within wireless device 200. Additionally or alternatively, a memory 252 can be used to store program codes and data for wireless device 200. Digital processor 230, controller/processor 250, and memory 252 can be implemented on one or more integrated circuits (ICs), application specific integrated circuits (ASICs), etc. By way of specific, non-limiting example, digital processor 230 can be implemented on a Mobile Station Modem (MSM) ASIC.

Figure 3:
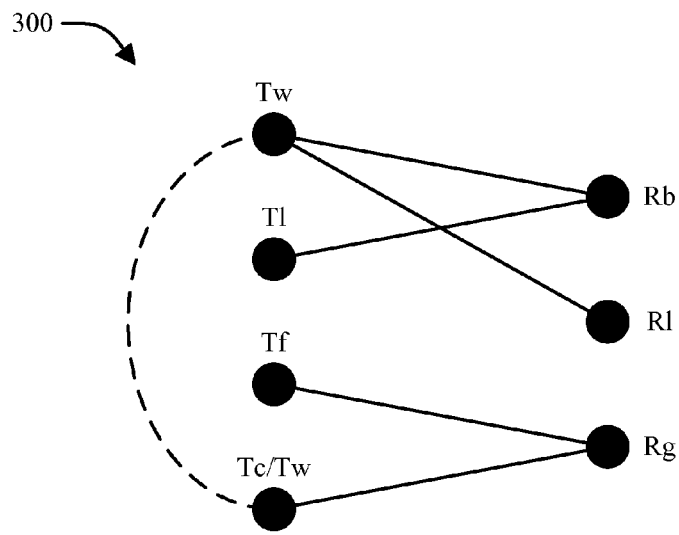
FIG. 3 illustrates an example set of radios that can be implemented in a wireless communication environment and respective potential collisions that can occur among the example set of radios.

In accordance with one aspect, CxM 240 can be utilized to manage operation of respective radios 220 utilized by wireless device 200 in order to avoid interference and/or other performance degradation associated with collisions between respective radios 220. By way of further illustration, graph 300 in FIG. 3 represents respective potential collisions between seven example radios in a given decision period. In the example shown in graph 300, the seven radios include a WLAN transmitter (Tw), an LTE transmitter (Tl), an FM transmitter (Tf), a GSM/WCDMA transmitter (Tc), an LTE receiver (Rl), a Bluetooth receiver (Rb), and a GPS receiver (Rg). The four transmitters are represented by four nodes on the left side of graph 300, and the three receivers are represented by three nodes on the right side of graph 300. A potential collision between a transmitter and a receiver is represented on graph 300 by a branch connecting the node for the transmitter and the node for the receiver. Accordingly, in the example shown in graph 300, collisions may exist between (1) a WLAN transmitter (Tw) and a Bluetooth receiver (Rb); (2) a LTE transmitter (Tl) and a Bluetooth receiver (Rb); (3) a WLAN transmitter (Tw) and a LTE receiver (Rl); (4) a FM transmitter (Tf) and a GPS receiver (Rg); and (5) a WLAN transmitter (Tw), a GSM/WCDMA transmitter (Tc), and a GPS receiver (Rg).

In accordance with another aspect, respective radios 220, such as those represented by graph 300, can impact and/or be impacted by respective other radios 220 through various mechanisms (e.g., as represented in graph 300). For example, radios 220 associated with device 200 can in some cases interfere with each other through radiative, conductive, and/or other interference mechanisms. In some cases, such interference can render some event combinations impossible or otherwise impractical to occur across different radios simultaneously. Accordingly, it can be appreciated that a substantially optimal decision on a given radio 220 (e.g., a decision regarding whether to provide a negative acknowledgement (NACK) or reduced transmit power for a WLAN transmitter radio, etc.) can in some cases depend on the status of respective other associated radios 220.

Figure 4:
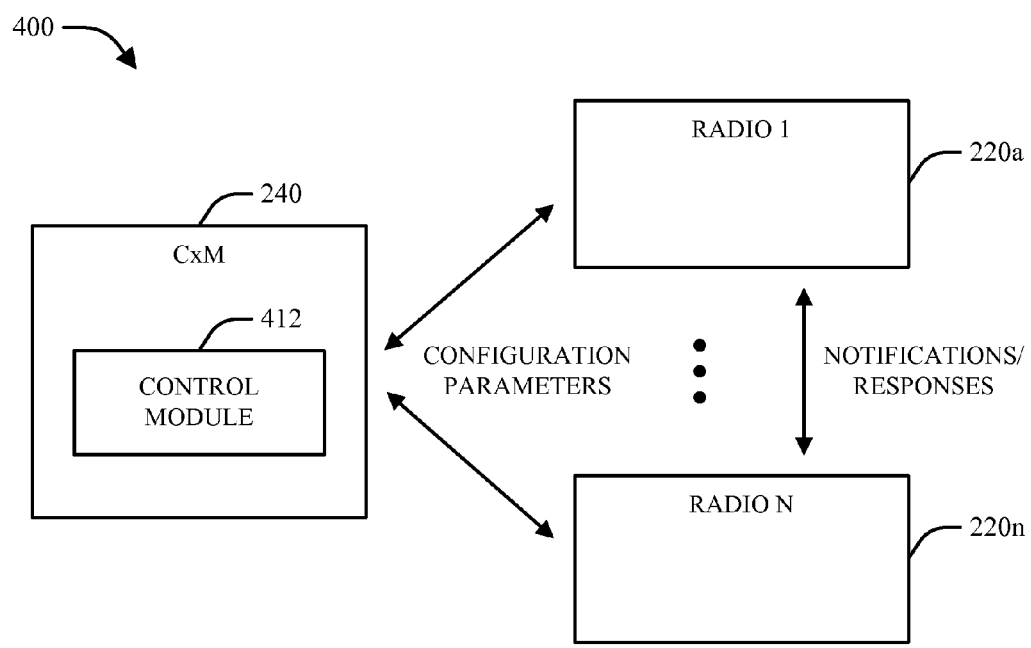
FIG. 4 is a block diagram of a system that facilitates a decentralized architecture for radio event management in a multi-radio communication environment in accordance with various aspects.

In accordance with a further aspect, a decentralized radio coexistence manager (also referred to herein as a coexistence manager or CxM) can handle management of radios in the presence of potential conflicts (e.g., as illustrated by graph 300) without requiring piece-wise solutions for each pair of mechanisms. An example implementation of a decentralized CxM architecture is illustrated by system 400 in FIG. 4. As shown in diagram 400, a CxM 240 that manages coexistence of a set of radios 220 can utilize a control module 412 to facilitate the management of coexistence between radios 220 at the radios 220 themselves in a decentralized manner.

With respect to the operation of system 400 and respective subsequently illustrated and described systems, it should be appreciated that while respective operations are described in relation to clustering and filtering of "radios," the techniques and/or mechanisms as described herein could be applied to any suitable radio(s) or, more generally, to any suitable transceiver(s) employed within a wired communication system, a wireless communication system, and/or any other suitable communication system. Further, it should be appreciated that the hereto appended claims are not intended to be limited to any specific implementation(s) unless explicitly stated otherwise.

In one example, CxM 240 can configure respective radios 220 and/or other suitable transceivers with coexistence-related information such as a list of colliders, potential coexistence solutions, priorities of different events, or the like. Based on such information, radios 220 or transceivers can intercommunicate for a coexistence solution among themselves as shown in system 400. For example, an aggressor radio/transceiver can transmit a notification of an event to be executed to one or more potential victim radios/transceivers, which can in turn provide a response to the aggressor radio/transceiver upon analyzing the notification and its underlying event. Such analysis can be based on, for example, absolute priority metrics that are compared and maintained by CxM 240 and universally understood across radios 220 or transceivers, databases of colliding events and potential resolutions that are maintained and updated by CxM 240 and/or radios 220 or transceivers, or the like. In another example, CxM 240 can periodically update configuration parameters associated with radios 220 or transceivers as needed. For example, CxM 240 can update parameters for a radio 220 when the radio 220 is enabled (e.g., enters an enabled state from a disabled state), changes band, changes operating state (e.g., from active to sleep), and so on. Various examples of techniques that can be utilized for providing and analyzing event notifications, configuring radios 220 or transceivers, and the like, are provided in further detail infra.

By implementing a decentralized coexistence architecture as shown in system 400, it can be appreciated that various benefits can be realized. These benefits can include, for example, improved scalability and modularity (e.g., to support the addition, removal, or modification of respective radios 220 or transceivers), reduced hardware complexity, increased design flexibility, increased overall performance, a reduction in management time and/or bus bandwidth required for radio management, and/or other similar benefits.

In accordance with one aspect, control module 412 and radios 220 or other transceivers can cooperate to implement functionality relating to coexistence management between radios 220 or other transceivers in various manners. In one example, a division of functionality between control module 412 and radios 220 or transceivers can be based on timescale, such that control module 412 handles control plane operations and/or other operations on a relatively slower timescale (e.g., sleep management, radio registration, long-term configuration, etc.), while individual radios 220 or transceivers handle data plane operations and/or other operations on a relatively faster timescale (e.g., processing of decisions based on incoming event notifications, etc.).

In one example, CxM 240 and/or control module 412, as well as various aspects of the functionality of radios 220 or other suitable transceivers, can be implemented using software, hardware, a combination of software and hardware, and/or any other suitable means. Further, communication between radios 220 or transceivers can be conducted in software (e.g., via message passing), through a hardware bus, and/or via other suitable structure. In one example, a manner in which respective radios 220 or transceivers communicate can be chosen based on latency requirements and/or any other suitable requirement(s). Additionally or alternatively, communication between CxM 240 and radios 220 or transceivers can be based on software messaging and/or other means of non-real time communication or conducted in any other suitable manner.

In another example, some or all information that is utilized to control data plane functionality of radios 220 or transceivers within system 400 can be provided by control module 412 based on parameters obtained by control module 412 from one or more higher layers. For example, an upper layer entity can deem a particular radio 220 of higher priority than another depending on present traffic conditions and/or other factors. Additionally or alternatively, control module 412 can relay information relating to radio link quality, coexistence constraints, or the like, which can be utilized to manage flows of respective radios 220. Various examples by which CxM 240 and radios 220 can operate in relation to each other and/or to other associated entities are described in further detail infra.

Figure 5:
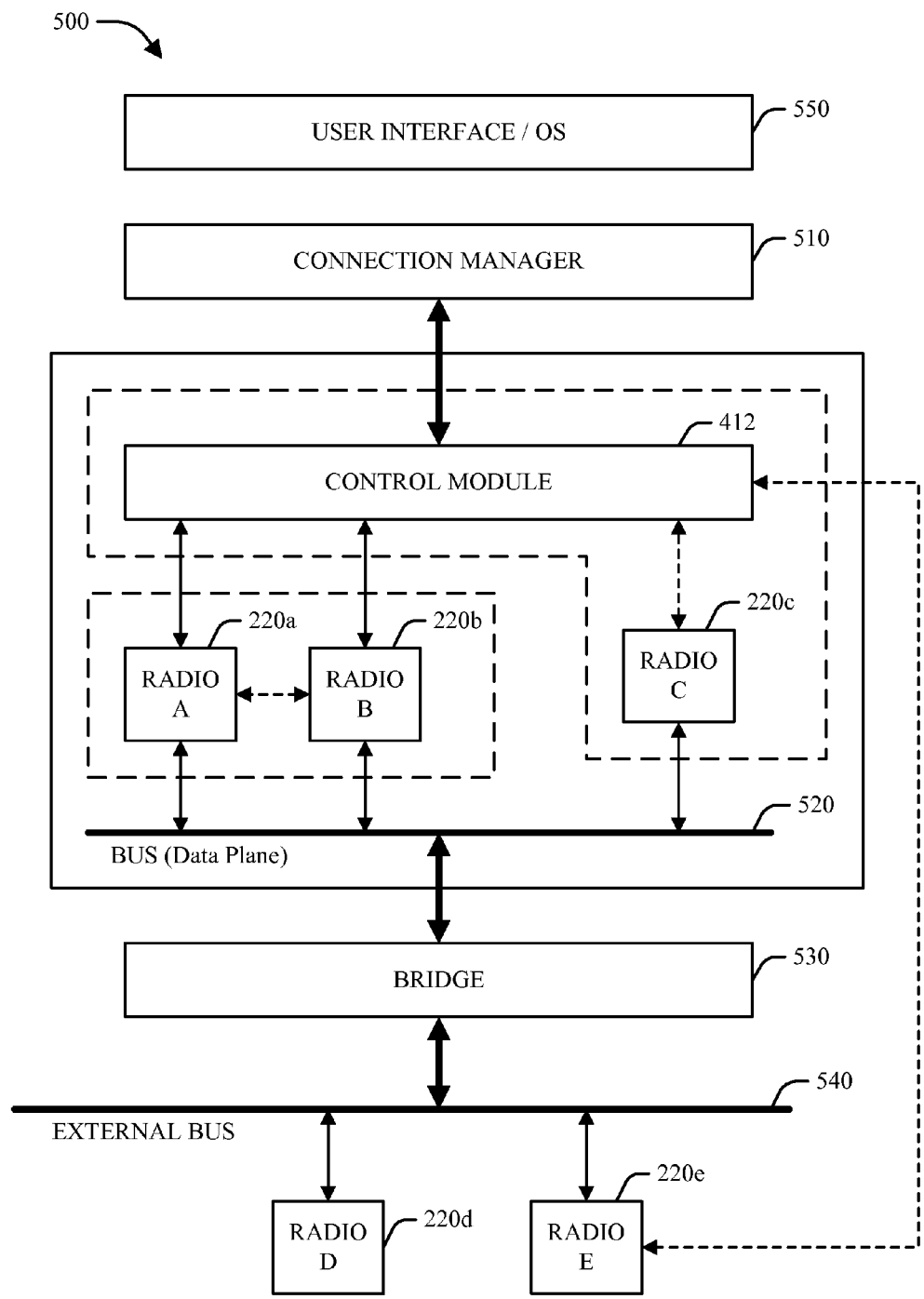
FIG. 5 illustrates an example radio coexistence manager architecture that can be implemented in accordance with various aspects.

Turning next to FIG. 5, provided is a system 500 that illustrates an example decentralized CxM architectures that can be implemented in accordance with various aspects. As shown in system 500, a shared bus 520 and/or other communication means can be provided between respective associated radios 220. Further, control module entity 412 can be connectively coupled to respective radios 220, an associated connection manager (CnM) 510, and/or other suitable entities. In some implementations (e.g., architectures implemented at least partially in software), respective elements in system 500 can also interact with user interface/operating system (OS) block(s) 550.

In accordance with one aspect, control module 412 can be implemented as a control mechanism in order to enable prioritization and resolution of events associated with radios 220. Additionally or alternatively, control module 412 can facilitate configuration of individual technologies. Control module 412 can utilize a logical host interface to respective radios 220, which can operate on a substantially slower timescale than the underlying events associated with radios 220.

In accordance with another aspect, respective radios 220 can perform various aspects of data plane radio event management by, for example, receiving notifications from one or more other radios 220 and communicating corresponding responses to the notifications back to the other radios 220. In one example, a shared bus 520 can be provided on which respective radios 220 can exchange real-time information. Shared bus 520 can, in turn, be associated with a bridge 530 and/or other mechanisms, from which one or more external buses 540 (and one or more radios 220 associated with such external buses 540) can be associated. In one example, buses 520 or 540 can operate on a substantially fast timescale as compared to the underlying events associated with radios 220.

As further shown in system 500, various radios 220 and/or control module 412 can be grouped together in various manners (e.g., logically grouped, grouped as part of a common software entity, etc.). Accordingly, in some cases, entities in system 500 that are associated with a common group can utilize direct communication between each other (e.g., via software message passing, dedicated internal buses, or the like) without requiring the use of buses 520 or 540 and/or other provided structures.

Figure 6:
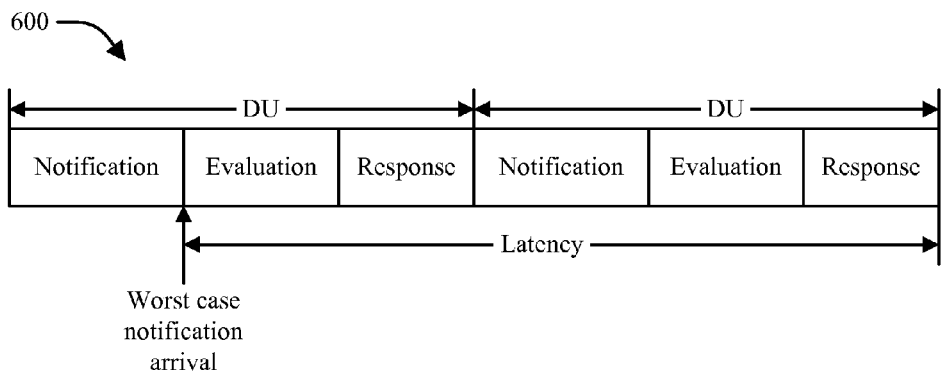
FIG. 6 illustrates operation of an example coexistence manager in time in accordance with various aspects.

Turning to diagram 600 in FIG. 6, an example timeline for CxM operation is illustrated. In one example, a CxM and/or related radios can operate according to a timeline divided into decision units (DUs) in time, which can be any suitable uniform or non-uniform length (e.g., 100 μs). By way of specific example, a DU can be divided into a notification phase (e.g., 50 μs) where various radios send notifications of imminent events, an evaluation phase (e.g., 30 μs) where notifications are processed, and a response phase (e.g., 20 μs) where commands are provided to various radios and/or other operations are performed based on actions taken in the evaluation phase. Various examples of techniques that can be implemented by a CxM and/or related radios during the respective phases provided above are described in further detail infra. In one example, timeline 600 can have a latency parameter defined by the worst case operation of timeline 600, e.g., the timing of a response in the case that a notification is obtained from a given radio immediately following termination of the notification phase in a given DU.

Figure 7:
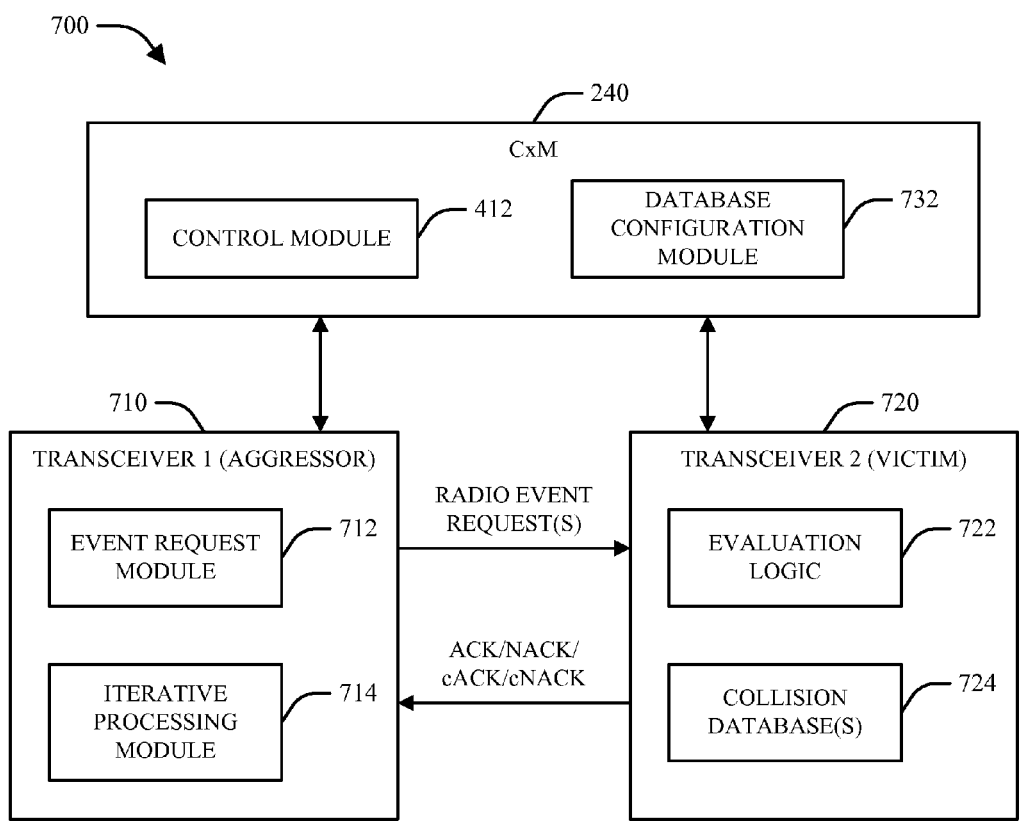
FIG. 7 is a block diagram of a system that facilitates decentralized multi-radio coexistence management in accordance with various aspects.

Turning next to FIG. 7, a block diagram of a system 700 that facilitates decentralized multi-radio coexistence management is illustrated. As shown in FIG. 7, a CxM 240 can be implemented to aid in managing coexistence between events conducted by various radios, such as an aggressor transceiver 710 and a victim transceiver 720. While an example utilizing one aggressor transceiver 710 and one victim transceiver 720 is illustrated in system 700, it should be appreciated that system 700 could include any suitable number of aggressor transceivers 710 and/or victim transceivers 720, which can interact in any suitable manner. Further, it should be appreciated that an aggressor transceiver 710 and/or a victim transceiver 720 can correspond to a transmit radio component, a receive radio component, or a combination thereof.

In accordance with one aspect, system 700 can operate with respect to one or more events. In one example, an event can be analyzed by respective transceivers 710-720 and can be characterized by parameters such as priority, start time and/or periodicity, duration, deadline, and/or other factors such as power level, associated frequencies, or the like. In one example, respective transceivers 710-720 can enumerate respective events associated with system 700 into a set $E_i$, where i is an integer between 1 to N (where N represents the total number of events associated with system 700).

In another example, respective transceivers 710-720 can assign (e.g., using evaluation logic 722 at victim transceiver 720 and/or similar mechanisms at aggressor transceiver 710) a set of unique default relative priority values (e.g., from 1 to N) for each enumerated event in $E_i$, which can be defined as the set $RP_i$. Relative priorities assigned by transceivers 710-720 can, in some cases, be altered by CxM 240 (e.g., via control module 412) in a static and/or dynamic manner. In one example, relative priorities maintained by transceivers 710-720 can be utilized in the estimation of absolute priorities.

With respect to absolute priorities, respective events can be assigned an absolute priority from a set of M possible absolute priority values. Absolute priorities can be defined as, for example, the set $AP_i$. In one example, absolute priorities can have globally defined meaning such that events from multiple transceivers 710-720 with the same absolute priority have equal importance. In another example, absolute priorities can, in some cases, be altered by CxM 240 (e.g., via control module 412) in a static and/or dynamic manner. Additionally or alternative, the absolute priority of a given event can in some cases increase over time (e.g., according to proximity to a timeout). In a further example, absolute priorities can be combined with relative priorities maintained by a given transceiver 710-720 into a larger set of absolute priorities.

By way of specific, non-limiting example, a set of definitions that can be utilized for absolute priorities is given in Table 1 below.

TABLE 1

Example definitions for absolute priorities.

| Absolute Priority | Name | Meaning |
| --- | --- | --- |
| 6 | Absolutely Critical | Connection will immediately terminate |
| 5 | Critical | Connection will expire soon; timer about to expire |
| 4 | Important | Data will be lost immediately; last opportunity |
| 3 | Semi-Important | Data will be lost soon; nearing a timeout |
| 2 | Moderate | Data has quality of service guarantees; some delay is acceptable |
| 1 | Best Effort | Best effort user traffic; delay is acceptable |
| 0 | Not Important | Data has no system priority; no timeouts will expire; any delay is acceptable |

In accordance with one aspect, transceivers 710-720 can operate in the data plane to manage respective radio events as follows. In the event that an aggressor (e.g., transmitter) transceiver 710 needs to perform an event (e.g., a transmit event), it can utilize an event request module 712 and/or other suitable means to inform other associated devices, such as CxM 240 and/or victim radio(s) 720, in advance via an event request (ER) or notification message. An ER message can include, for example, a technology ID corresponding to aggressor transceiver 710, an absolute priority of the event, a time and/or duration of the event, or the like. Upon receiving an ER message, a victim transceiver 720 can utilize evaluation logic 722 and/or other suitable means to determine whether the request event collides with one or more internal events at the victim transceiver 710. If a collision with an internal event is detected, the absolute priority of the internal event is compared with that of the requested external event. Based on this comparison, victim transceiver 720 can respond with an acknowledgement (ACK)/negative acknowledgement (NACK) message to the aggressor transceiver 710.

In accordance with one aspect, an ACK/NACK message transmitted by victim transceiver 720 can take various forms based on an analysis of the corresponding requested external event. For example, an absolute NACK (aNACK) can be provided in the event that an irresolvable conflict exists between the requested external event and an internal event of the victim transceiver 710. Alternatively, if a resolvable conflict is found, victim transceiver 720 can instead respond with a conditional NACK (cNACK) that proposes a change to the settings of the external event (e.g., transmission on a different channel or at a different power level, etc.). In one example, a cNACK message can include information similar to that in the corresponding ER message. In another example, a cNACK message can be configured such that the corresponding aggressor transceiver 710 is required to implement the provided changes before the underlying event can be executed.

If, on the other hand, no conflict is found between a requested external event and a set of internal events, a victim transceiver 720 can remain silent or transmit an absolute ACK (aACK) message to the corresponding aggressor transceiver 710. In the event that acknowledgment is based on silence, an aggressor transceiver 710 can be configured to execute an event as requested if no responses to the contrary are received from victim transceivers 720 within a predetermined time period. Alternatively, a victim radio can submit a conditional ACK (cACK) message to a corresponding aggressor transceiver 710 that accepts the requested event with a proposed change to the settings of the event. In such a case, the aggressor transceiver 710 can be configured to select whether to implement or ignore the proposed changes at its discretion. If the aggressor transceiver 710 grants cACK, it can inform the victim transceiver 720 of its decision by submitting its own ACK message to the victim transceiver 720.

In accordance with one aspect, victim transceiver 720 can utilize one or more collision databases 724 to determine whether a requested external event collides with an internal event associated with victim transceiver 720. In one example, collision database(s) 724 can be generated and maintained by CxM 240 (e.g., via a database configuration module 732) and provided to victim transceiver 720. Alternatively, victim transceiver 720 can generate and/or maintain at least a portion of collision database(s) 724 independently.

Figure 8:
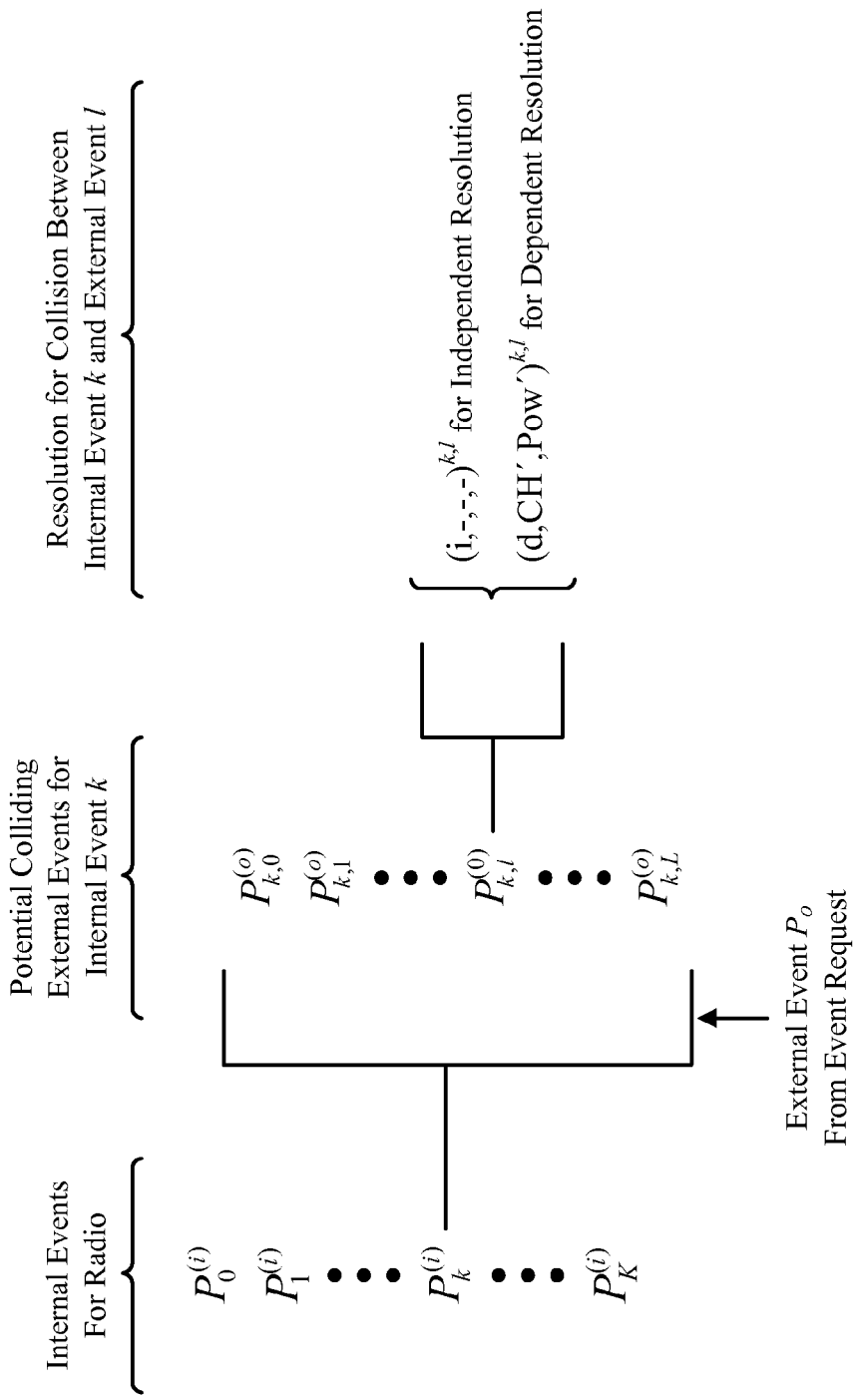
FIG. 8 illustrates an example collision database that can be maintained and utilized for radio coexistence management in accordance with various aspects.

FIG. 8 illustrates an example collision database 800 (also referred to herein as a "radio collision database") that can be utilized by a victim transceiver 720 in system 700. By way of non-limiting example, collision database 800 can be created and maintained by an associated CxM, and portions of the database pertaining to a given radio can be stored on a lookup table (LUT) associated with the radio (e.g., using firmware and/or software at the radio).

As illustrated in FIG. 8, collision database 800 can include a listing of internal events associated with a given radio, each of which can be related to a set of external events that can potentially collide with the listed internal events. In the event that a potential internal event/external event collision is resolvable, collision database 800 can further include a set of resolutions for the potential collision. Such resolutions can include, for example, independent resolutions (e.g., resolutions that can be implemented entirely by a victim radio and do not require a cACK/cNACK message), dependent resolutions (e.g., resolutions that require a conditional cACK/cNACK message), or the like.

By way of example, a radio can utilize collision database 800 as follows. Once a request for an external event is received by a radio, the radio can determine whether the external event lies within the list of potential colliding events with any scheduled internal event. If so, the resolution field for the detected collision is read. If an independent solution is present, the solution is implemented. Alternatively, if a dependent solution is present, the radio can read the fields to be changed with respect to the external event to form an appropriate conditional response to the request.

Figure 9:
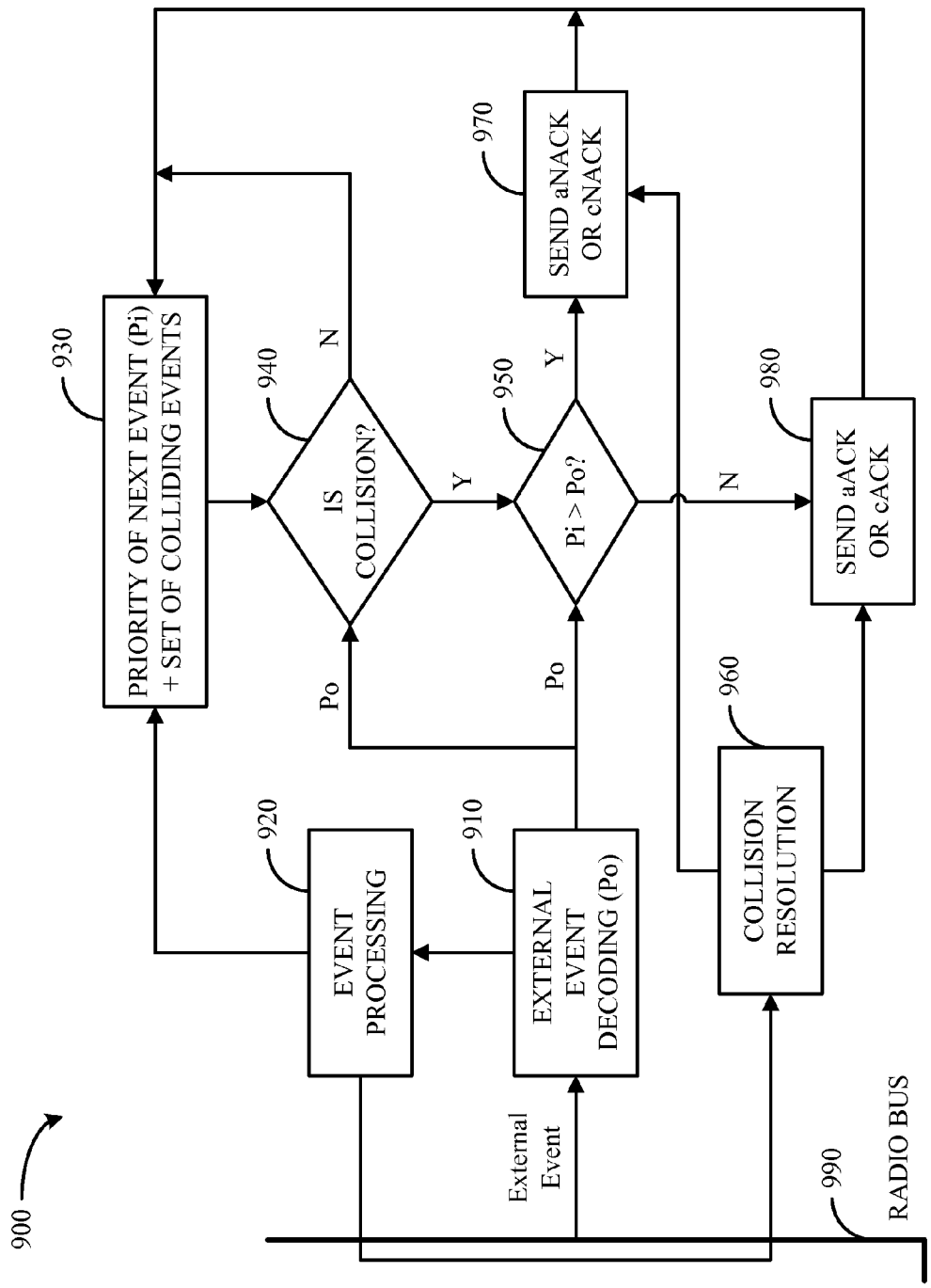
FIG. 9 illustrates an example radio operating procedure that can be utilized in connection with multi-radio coexistence management in accordance with various aspects.

In accordance with another aspect, an example operating procedure for evaluation logic 722 within victim transceiver 720 is illustrated in further detail by diagram 900 in FIG. 9. It should be appreciated, however, that the example procedures given by diagram 900 are provided by way of example and not limitation and that, unless explicitly stated otherwise, the hereto appended claims are not intended to be limited to such procedures. In one example, before receiving an external event, an event processing block 920 can identify the next scheduled event for the radio. With respect to the next scheduled event, event processing block 920 can further identify the absolute priority level (Pi) of the event and the potential collider database for the event (e.g., as shown by block 930).

Upon receiving a request for an external event (e.g., via a radio bus 990 and/or by other means), the event request can be decoded at an external event decoding block 910 to obtain an absolute priority level of the external event (Po) and/or other suitable information. Subsequently, the radio can determine, via decision block 940, whether the external event collides with the next scheduled internal event. If no collision is detected, analysis can proceed for the next internal event. Otherwise, the priority of the scheduled internal event can be compared to the priority of the external event at decision block 950. If the priority of the internal event is higher, the radio can send an aNACK or cNACK message back to the requesting radio, as shown in block 970. Otherwise, the radio can send an aACK or cACK message (or no message) to the requesting radio as shown at block 980. In one example, whether to send an absolute or conditional ACK/NACK at block 970 and/or block 980 can be based on resolutions identified via a collision resolution block 960.

With respect to CxM 240, it can be appreciated that CxM 240 can perform operations such as registering active radios (e.g., to obtain necessary static parameters such as bands, maximum transmit power, etc.); maintaining and updating priorities of radios and their associated events; maintaining and updating the set of collision events and resolutions for respective associated radios; and/or other suitable operations.

In one example, the set of collision events and resolutions for respective radios can be maintained and updated by database configuration module 732 and provided to the corresponding radios to facilitate knowledge at the radios of details pertaining to their respective operations. In accordance with one aspect, sets maintained by database configuration module 732 can include receiver databases that list the set of transmit events that potentially collide with each scheduled receive event and their proper resolution(s). Such resolutions can, for example, either require changes from the corresponding transmit radio or can be implemented independently by the receive radio.

Additionally or alternatively, sets maintained by database configuration module 732 can include transmit databases that list the set of colliding receive events for respective transmit events and their corresponding properties. In one example, a transmit database can be utilized for a transmit radio with respect to periodic receive events, such that potential collisions with periodic receive events can be worked out in advance at the transmitting radio by comparing the absolute priorities of a desired transmit event and the related receive event(s) and performing resolution(s) as necessary.

Figure 10:
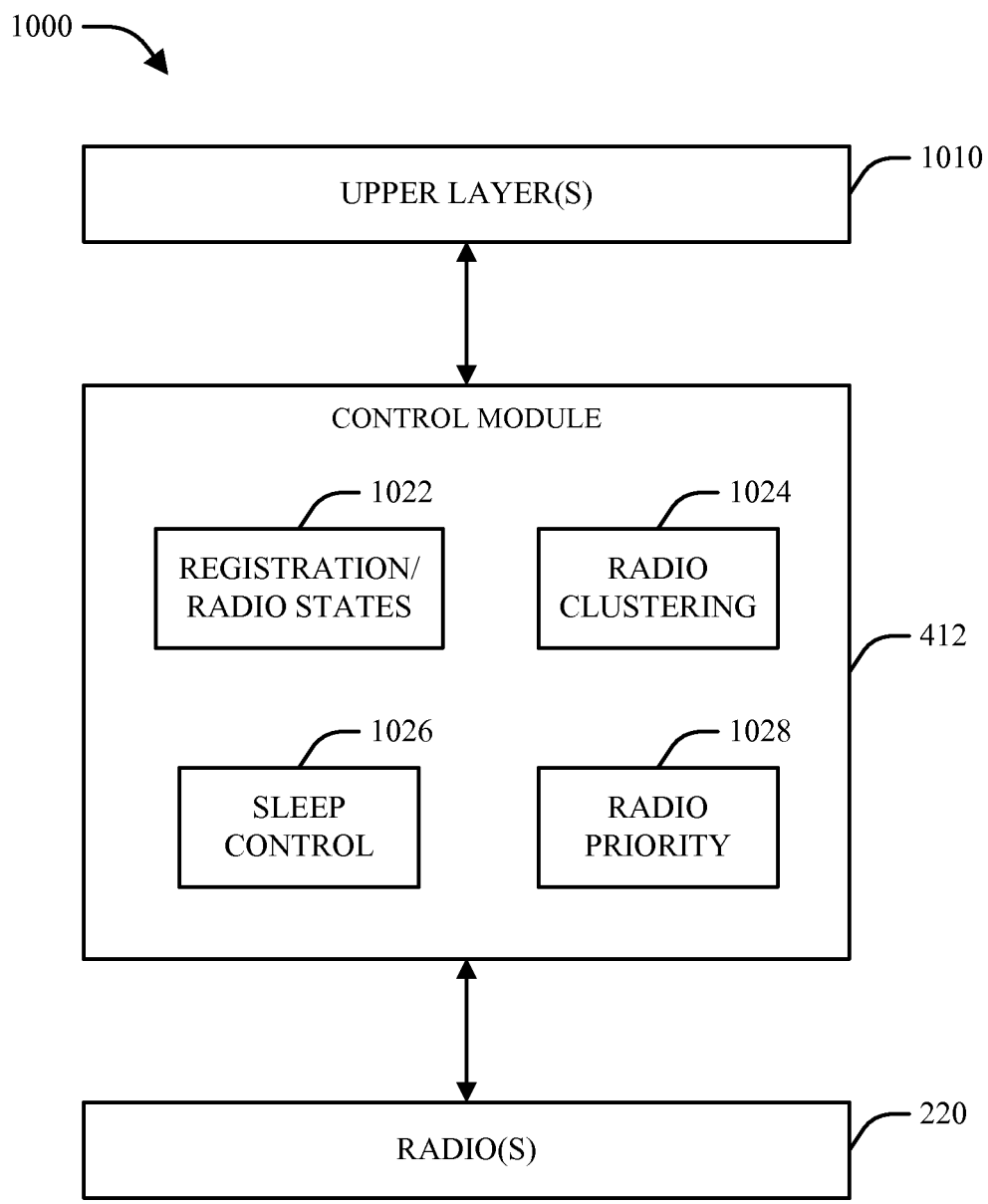
FIG. 10 illustrates an example architecture for a control plane radio coexistence manager implementation in accordance with various aspects.

Turning to FIG. 10, a system 1000 is provided that illustrates various manners in which control module 412 at CxM 240 can be implemented. It should be appreciated, however, that system 1000 is provided by way of specific, non-limiting example and that any suitable implementation(s) could be utilized for control module 412 and/or other suitable entities as described herein. Further, it should be appreciated that unless explicitly stated otherwise, the hereto appended claims are not intended to be limited to any specific implementation or combination thereof.

In one example, operation of control module 412 with respect to respective radios 220 can begin at a registration block 1022 by registering respective radios 220 and obtaining their updated state(s). For example, when respective radios 220 are turned on or otherwise enabled, the radios 220 can be configured to register with registration block 1022. During such registration, control module 412 can advertise a current used protocol, based on which registration can be performed. During registration, a radio 220 can provide one or more static parameters such as a frequency band (e.g., to define piecewise collisions), maximum transmit powers, any periodic events (e.g., periodically sent pilots) the radio utilizes, potential RF knobs of the radio, or the like. In another example, in the event that a radio 220 changes its state (e.g., from active to sleep), it can be configured to update control module 412.

In accordance with one aspect, control module 412 can further use a radio clustering block 1024 to define radio clustering during registration. This can be performed, for example, using information relating to potential pairwise collisions between radios. For example, if two radios 220 can potentially collide when operating in given bands, radio clustering block 1024 can take such information into account when determining a clustering for radios 220. Information relating to the clustering of radios 220 can subsequently be utilized by a sleep control block 1026 to control a sleep mode of control module 412 and/or an associated CxM (e.g., based on operating states of respective radios 220 associated with respective sleep clusters) and/or by other suitable mechanisms for other operations.

In accordance with another aspect, control module 412 can leverage information relating to priorities of events associated with respective radios 220 via a radio priority block 1028. Such information can include relative or absolute priorities of respective radios and/or radio events, priorities of respective constituent atomic events (e.g., in the case of composite events), or the like. In one example, information obtained by radio priority block 1028 can be utilized by an associated CxM to generate collision databases for respective radios 220 (e.g., via a database configuration module 732).

In accordance with a further aspect, control module 412 can facilitate interaction with one or more entities associated with upper layer(s) 1010. By way of example, control module 412 can provide respective information to upper layer(s) 1010, which in turn can utilize a connectivity engine and/or other means to identify whether system 1000 is utilizing an application on a radio 220 with a coexistence issue and, if so, to decide whether to move that application to another radio. Additionally or alternatively, control module 412 and upper layer(s) 1010 can coordinate with respect to any suitable operation(s) (e.g., changes in radio technology, etc.). In another example, upper layer(s) 1010 can provide information to be utilized by control module 412 in managing radio coexistence. Thus, by way of example, upper layer(s) 1010 can provide information to control module 412 relating to how to set relative priorities between radios 220, such that factors such as applications to be utilized, operating interferences, etc., can be considered in setting the priorities for different radios 220.

Returning to diagram 600 in FIG. 6 and system 700 in FIG. 7, it can be appreciated that respective aggressor transceivers 710 can transmit event notifications to respective victim transceivers 720 on the notification period of a DU, based on which victim transceivers 720 can provide corresponding responses during the response period of the DU. In accordance with one aspect, during the notification segment of a DU, any aggressor transceiver 710 having a future event can send an event request message identifying information such as whether the event is for transmission or reception, the DU index at which the event starts, the DU index at which the event ends, and/or any other physical layer (PHY), medium access control (MAC), and/or other information (e.g., event power level, channel information, bandwidth information, quality of service (QoS) parameters, etc.) that can assist CxM 240 in making an educated decision. In accordance with a further aspect, after working out resolutions for respective events in a DU, a victim transceiver 720 can send responses to the involved aggressor transceivers 710 at the evaluation segment of the DU. By way of specific, non-limiting example, a format that can be utilized for responses can vary on a per-transceiver basis.

In accordance with one aspect, due to the distributed nature of system 700, RE messages submitted by aggressor transceiver 710 and corresponding responses submitted by victim transceiver 720 can in some cases not converge on a first iteration. Accordingly, aggressor radio 714 can utilize an iterative processing module 714 and/or other suitable means to ensure proper coexistence for a given radio event before executing the radio event. As an example of iterative processing, a radio A can submit an ER message that is received by radios B and C. Initially, radio B can detect a collision and respond with a cACK/cNACK, while radio C can detect no collision and respond with an aACK message. However, upon radio A accepting and implementing the condition of radio B, the modified event could subsequently conflict with radio C. Accordingly, an iterative processing module 714 can be utilized to facilitate transmission of a second RE message by radio A to resolve the conflict between radios A and C. Alternatively, radios B and/or C can advertise their respective internal events such that radio A will not accept a cACK from radio B if it collides with radio C depending on the relative priorities of radios B and C. As another alternative, radio C can indicate potential restrictions in its ACK message to radio A.

In accordance with a further aspect, system 700 can be configured to handle multiple internal events as follows. For example, various solutions can be implemented in the event that aggressor transceiver 710 sends an ER message that is received by victim transceiver 720 but victim transceiver 720 has two or more internal events ongoing or scheduled that could conflict with the requested event. For example, victim transceiver 720 can complete priority comparison for all events, such that if there are multiple resolutions, victim transceiver 720 sends the resolution for the internal event with highest priority. Alternatively, victim transceiver 720 and/or CxM 240 can consider possible combinations of internal events as separate internal event entries in an associated LUT.

Similarly, victim transceiver 720 can implement various solutions for a case in which multiple ER request messages are received from one or more aggressor transceivers 710. For example, in the case of two ER messages received from separate aggressor transceivers 710, victim transceiver 720 can send independent responses to each aggressor transceiver 710. Alternatively, if the responses could be dependent, possible combinations of external events can be considered by victim transceiver 720 and/or CxM 240 as separate external events in an associated LUT.

Figure 11:
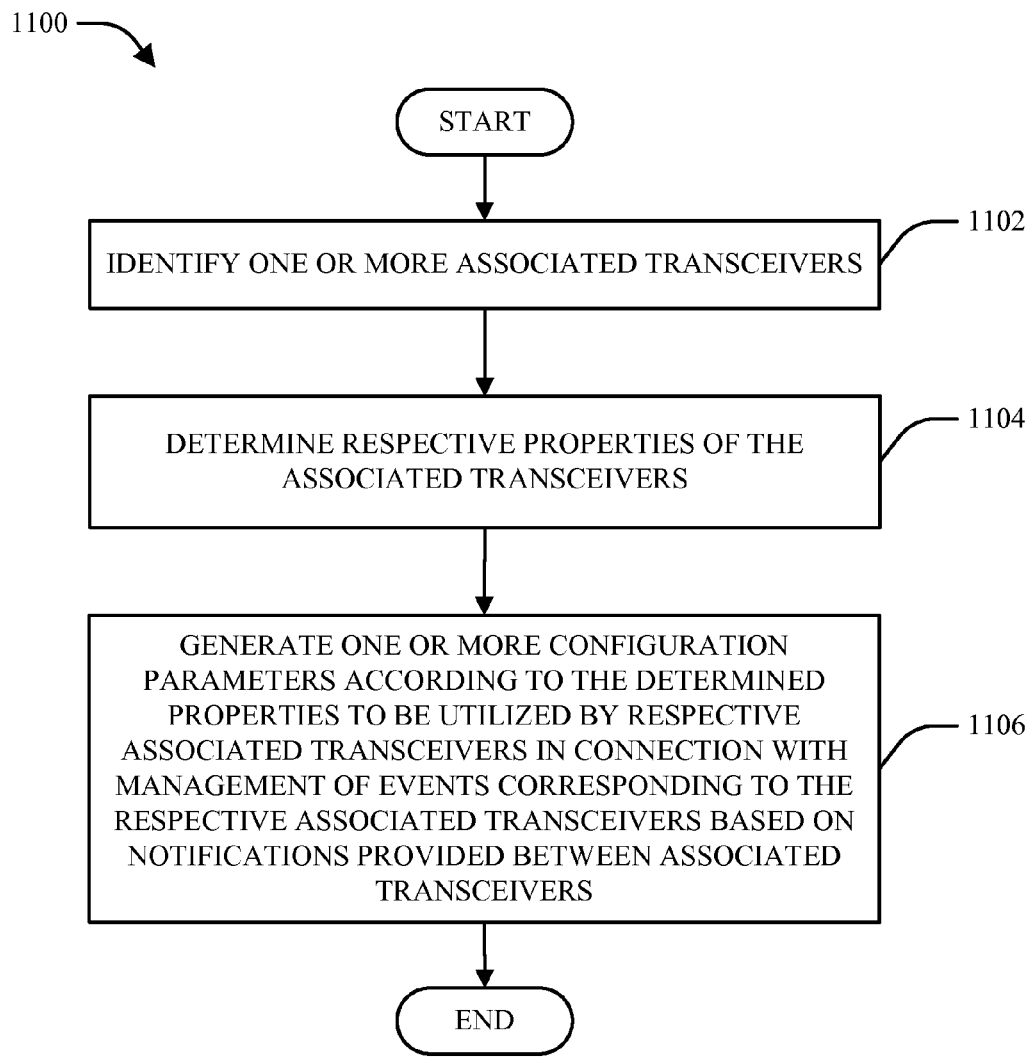
FIGS. 11-13 are flow diagrams of respective methodologies for managing coexistence between multiple transceivers associated with a communications device.
Figure 12:
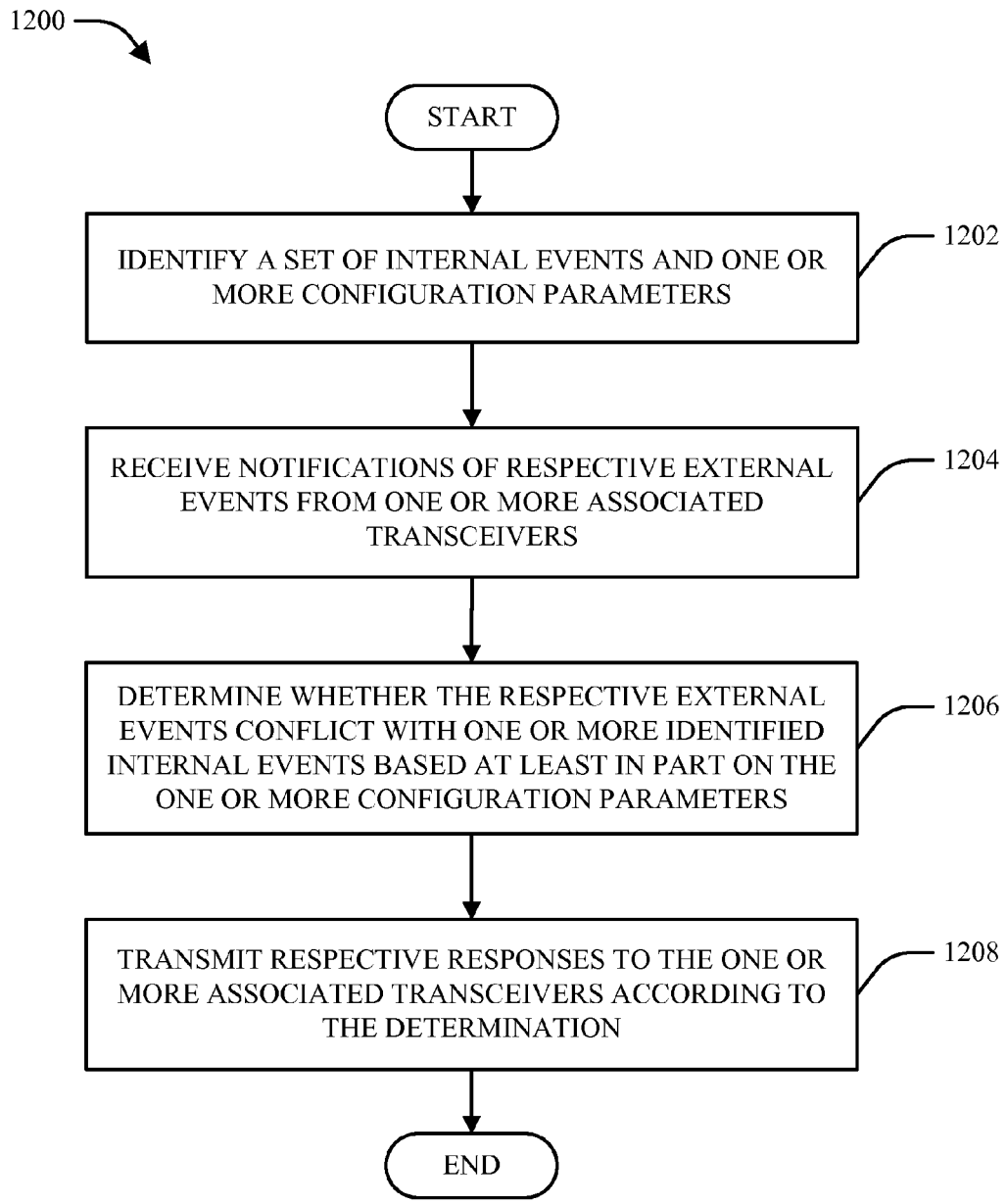
Figure 13:
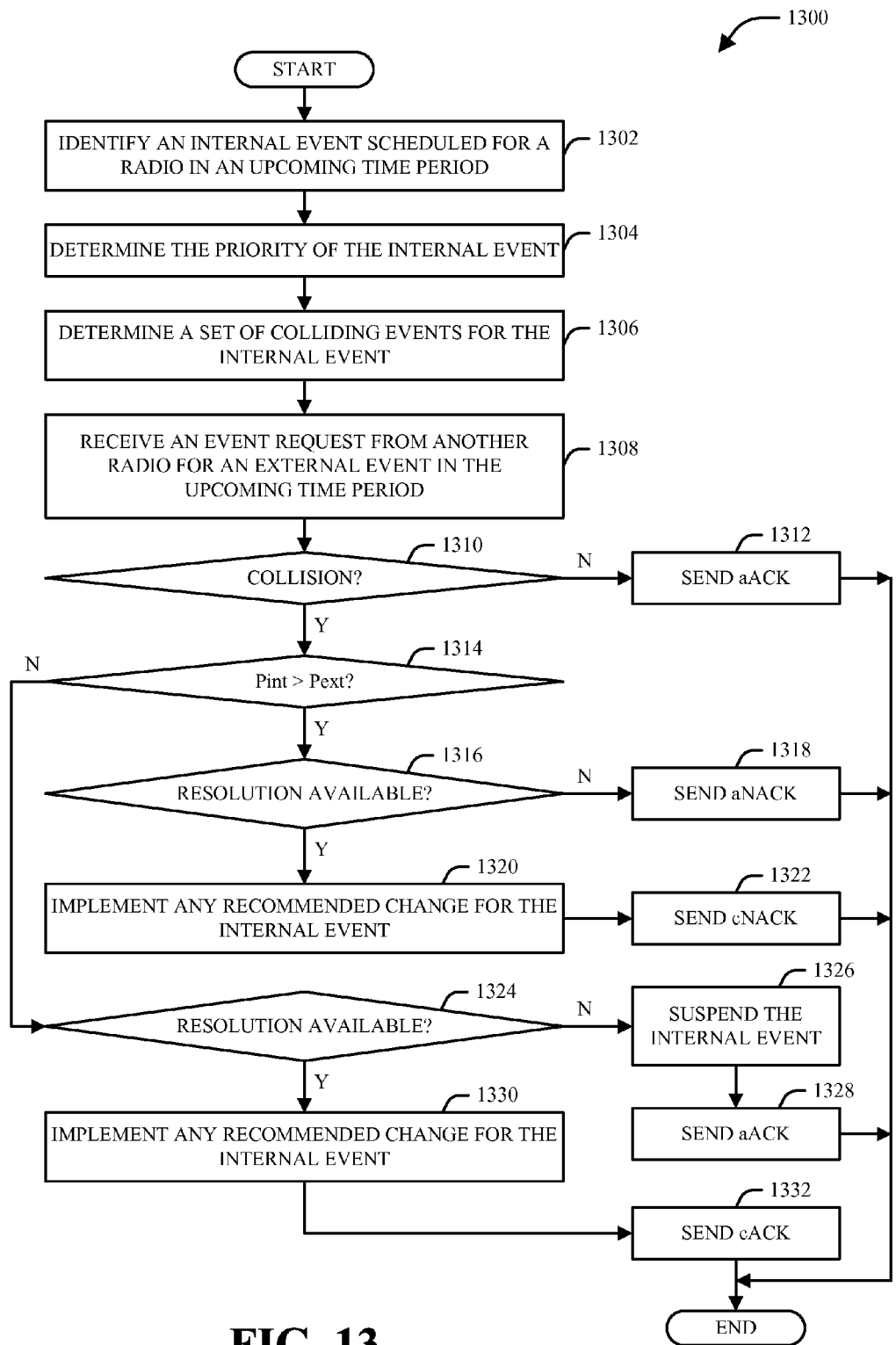

Referring now to FIGS. 11-13, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 11, illustrated is a methodology 1100 for managing coexistence between multiple transceivers associated with a communications device. It is to be appreciated that methodology 1100 can be performed by, for example, a wireless device (e.g., wireless device 110 or 200, via a control module 412 associated with a CxM 240) and/or any other appropriate network device. Methodology 1100 can begin at block 1102, wherein one or more associated transceivers are identified. Next, at block 1104, respective properties of the associated transceivers are determined Methodology 1100 can then conclude at block 1106, wherein one or more configuration parameters are generated according to the properties determined at block 1104, which can be utilized by the transceivers identified at block 1102 in connection with management of events corresponding to the respective transceivers based on notifications provided between the respective transceivers.

FIG. 12 illustrates a second methodology 1200 for managing coexistence between multiple transceivers associated with a communications device. Methodology 1200 can be performed by, for example, a wireless terminal (e.g., wireless device 110 or 200, via one or more radios 220) and/or any other suitable network entity. Methodology 1200 begins at block 1202, wherein a set of internal events and one or more configuration parameters are identified. Next, at block 1204, notifications of respective external events are received from one or more associated transceivers. At block 1206, it can then be determined whether respective external events for which notifications are received at block 1204 conflict with one or more internal events identified at block 1202 based at least in part on the configuration parameter(s) received at block 1202. Methodology 1200 can then conclude at block 1208, wherein respective responses are transmitted to the transceiver(s) from which the notifications are received at block 1204 according to a result of the determination performed at block 1206.

Turning next to FIG. 13, a third methodology 1300 for managing coexistence between multiple transceivers associated with a communications device is illustrated. Methodology 1300 can be performed by, for example, a multi-radio wireless device and/or any other suitable wireless network entity. Methodology 1300 can begin at block 1302, wherein an internal event scheduled for a radio in an upcoming time period is identified. The priority of the internal event is then determined at block 1304, and a set of colliding events for the internal event is determined at block 1306. Next, at block 1308, an event request is received from another radio for an external event in the upcoming time period.

At block 1310, it is then determined whether the internal event identified at block 1302 and the external event requested at block 1308 collide. If not, methodology 1300 concludes at block 1312, wherein an aACK message is sent. Otherwise, methodology 1300 continues to block 1314, where it is determined whether the priority of the internal event exceeds the priority of the external event. If the priority of the internal event is greater, an attempt is made to find a resolution for the event combination at block 1316. If no resolution is available, methodology 1300 concludes at block 1318, wherein an aNACK message is sent. Otherwise, if a resolution is found, any recommended change for the internal event provided by the resolution is implemented at block 1320 and methodology 1300 concludes at block 1322, wherein a cNACK message is sent.

If, alternatively, the priority of the external event is greater than that of the internal event, methodology 1300 proceeds from block 1314 to block 1324, where an attempt is made to find a resolution for the event combination. If no resolution is available, the identified internal event is suspended at block 1326 and methodology 1300 concludes at block 1328, wherein an aACK message is sent. Otherwise, if a resolution is found, any recommended change for the internal event provided by the resolution is implemented at block 1330 and methodology 1300 concludes at block 1332, wherein a cACK message is sent.

Figure 14:
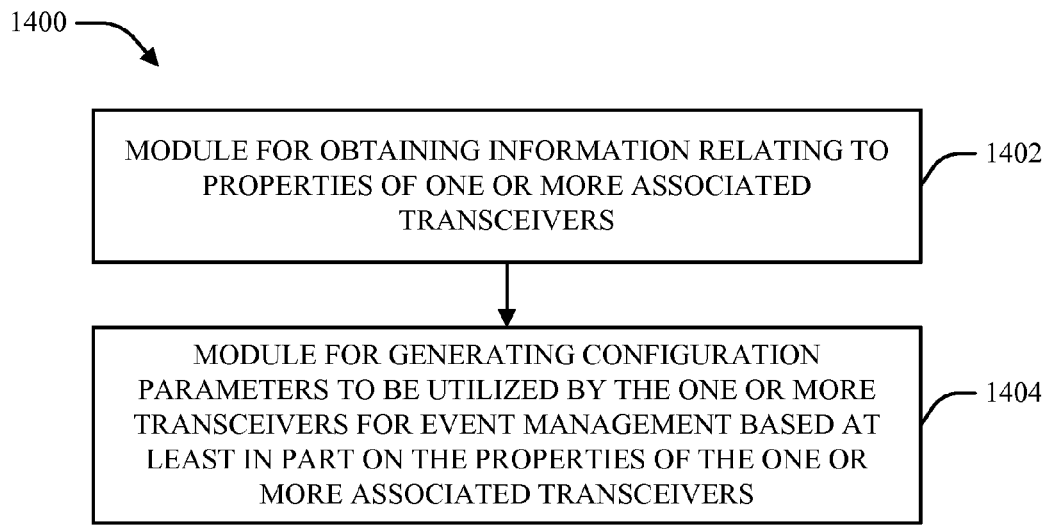
FIGS. 14-15 are block diagrams of respective apparatuses that facilitate implementation of a decentralized architecture for transceiver coexistence for a device operable in a communication system.
Figure 15:
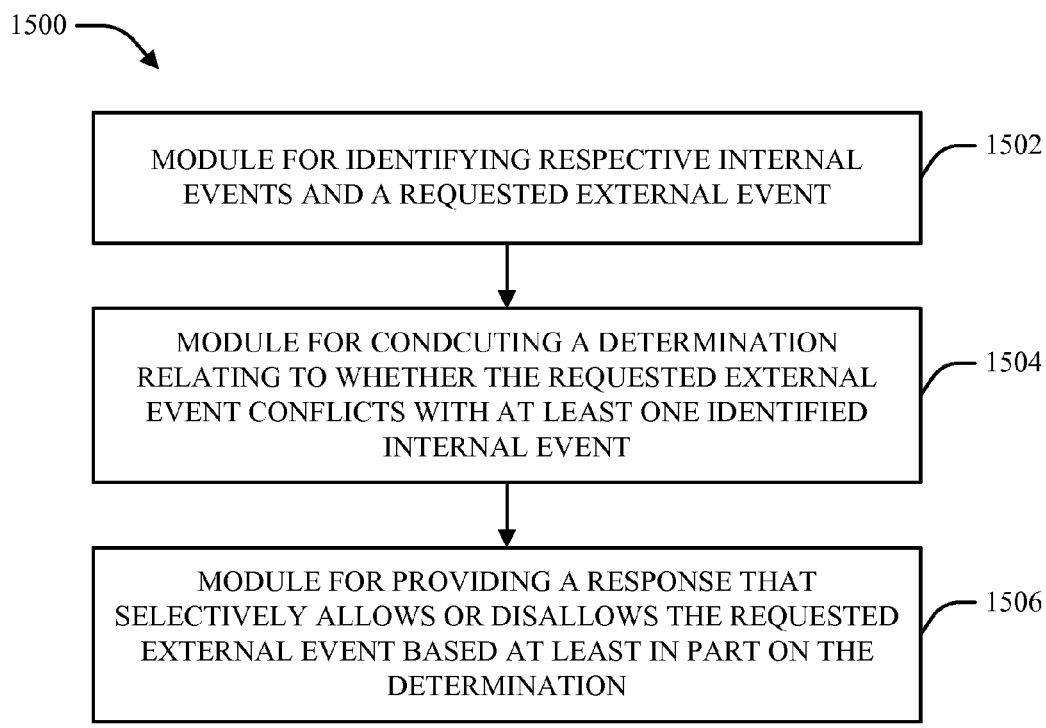

Referring now to FIGS. 14-15, respective apparatuses 1400-1500 that facilitate implementation of a decentralized architecture for transceiver coexistence for a device operable in a communication system are illustrated. It is to be appreciated that apparatuses 1400-1500 are represented as including functional blocks, which can be functional blocks that represent functions implemented by a processor, software, or combination thereof (e.g., firmware).

With reference first to FIG. 14, a first apparatus 1400 that facilitates a decentralized architecture for transceiver coexistence is illustrated. Apparatus 1400 can be implemented by a wireless device (e.g., wireless device 110 or 200, via a CxM 240) and/or another suitable network device and can include a module 1402 for obtaining information relating to properties of one or more associated transceivers and a module 1404 for generating configuration parameters to be utilized by the one or more transceivers for event management based at least in part on the properties of the one or more associated transceivers.

Turning next to FIG. 15, a second apparatus 1500 that facilitates a centralized architecture for transceiver coexistence is illustrated. Apparatus 1500 can be implemented by a multi-radio mobile device (e.g., wireless device 110 or 200, via one or more radios 220) and/or another suitable network device and can include a module 1502 for identifying respective internal events and a requested external event, a module 1504 for conducting a determination relating to whether the requested external event conflicts with at least one identified internal event, and a module 1506 for providing a response that selectively allows or disallows the requested external event based at least in part on the determination.

Figure 16:
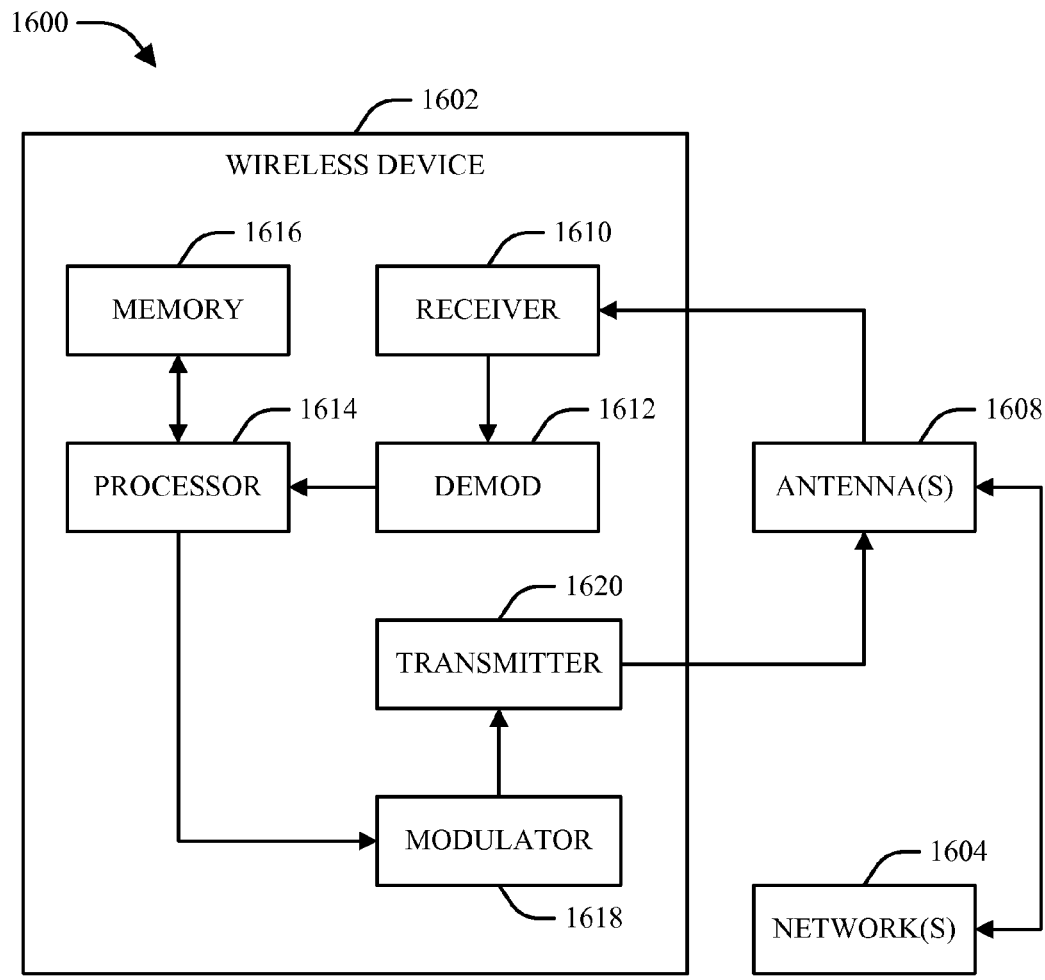
FIG. 16 is a block diagram of a wireless communications device that can be utilized to implement various aspects described herein.

FIG. 16 is a block diagram of a system 1600 that can be utilized to implement various aspects of the functionality described herein. In one example, system 1600 includes a wireless device 1602. As illustrated, wireless device 1602 can receive signal(s) from one or more networks 1604 and transmit to the one or more networks 1604 via one or more antennas 1608. Additionally, wireless device 1602 can comprise a receiver 1610 that receives information from antenna(s) 1608. In one example, receiver 1610 can be operatively associated with a demodulator (Demod) 1612 that demodulates received information. Demodulated symbols can then be analyzed by a processor 1614. Processor 1614 can be coupled to memory 1616, which can store data and/or program codes related to terminal 1602. Additionally, wireless device 1602 can employ processor 1614 to perform methodologies 1100-1300 and/or other similar and appropriate methodologies. Wireless device 1602 can also include a modulator 1618 that can multiplex a signal for transmission by a transmitter 1620 through antenna(s) 1608.

With respect to the above description, one of ordinary skill in the art can appreciate that various aspects described above can be implemented by hardware, software, firmware, middleware, microcode, or any combination thereof When the systems and/or methods are implemented in software, firmware, middleware or microcode, program code or code segments, they can be stored in a machine-readable medium, such as a memory or storage device. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

Moreover, those of skill in the art can appreciate that information and signals can be represented using any of a variety of different technologies and techniques. For example, data, instructions, commands, information, signals, bits, symbols, and/or chips that may be referenced throughout the above description can be represented by voltages, currents, electromagnetic waves, magnetic fields or particles, optical fields or particles, or any combination thereof.

In addition, it is to be understood that the steps of the various methods and/or algorithms as described in connection with the disclosure above can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An example storage medium can be coupled to a processor such that the processor can read information from, and write information to, the storage medium. In the alternative, the storage medium can be integral to the processor. The processor and the storage medium can reside in an ASIC, which in turn can reside in a user terminal and/or in any other suitable location. Alternatively, processor and the storage medium can reside as discrete components in a user terminal.

The above description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is instead to be accorded the widest scope consistent with the principles and novel features disclosed herein. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
  identifying one or more associated transceivers;
  determining respective properties of the associated transceivers;
  generating one or more configuration parameters to be utilized by respective associated transceivers in connection with management of events associated with the respective associated transceivers based on notifications provided between associated transceivers;
  generating absolute priorities of events executable by the one or more associated transceivers; and
  maintaining a set of potential collision events between respective associated transceivers and a set of resolutions corresponding to respective potential collision events according to an absolute priority of each of the respective potential collision events.

2. The method of claim 1, wherein:
the determining comprises identifying a transceiver entering an enabled state from a disabled state; and
the method further comprises registering the transceiver entering an enabled state.

3. The method of claim 1, wherein:
the determining comprises determining respective operating states of the one or more associated transceivers; and
the method further comprises configuring an associated sleep mode based at least in part on the respective operating states of the one or more associated transceivers.

4. The method of claim 1, further comprising conveying information relating to a database of potential collision events and corresponding resolutions generated for a designated associated transceiver to the designated associated transceiver.

5. The method of claim 1, in which the absolute priorities are generated in a consistent manner across substantially all associated transceivers.

6. The method of claim 1, wherein the generating comprises:
receiving event conflict information from the one or more associated transceivers; and
generating one or more configuration parameters based at least in part on the event conflict information.

7. The method of claim 6, wherein the generating further comprises:
identifying a conflict between a set of events corresponding to the one or more associated transceivers based on the event conflict information; and
instructing modification of at least one of a frequency channel or a radio technology utilized for at least one event associated with the conflict.

8. The method of claim 1, wherein the generating comprises:
receiving configuration information from one or more upper layer entities; and
generating one or more configuration parameters based at least in part on the configuration information.

9. The method of claim 1, wherein the one or more associated transceivers comprise at least one radio.

10. A wireless communications apparatus, comprising:
a memory that stores data relating to one or more associated radios; and
a processor configured to determine respective properties of the associated radios, to generate one or more configuration parameters based at least in part on the respective properties of the associated radios, to provide the configuration parameters to the associated radios in connection with management of events corresponding to the associated radios based on notifications provided between the associated radios, to generate absolute priorities of events executable by the one or more associated transceivers, and to maintain a set of potential collision events between respective associated radios and a set of resolutions corresponding to respective potential collision events according to an absolute priority of each of the respective potential collision events.

11. The wireless communications apparatus of claim 10, wherein the processor is further configured to identify a radio entering an enabled state from a disabled state and to register the radio entering an enabled state.

12. The wireless communications apparatus of claim 10, wherein the processor is further configured to determine operating states of the one or more associated radios and to configure a sleep mode of the wireless communications apparatus based at least in part on the operating states of the one or more associated radios.

13. The wireless communications apparatus of claim 10, wherein the processor is further configured to convey information relating to a database of potential collision events and corresponding resolutions generated for a designated associated radio to the designated associated radio.

14. The wireless communications apparatus of claim 13, wherein the database of potential collision events comprises information relating to the absolute priorities of radio events associated with the potential collision events and the processor is further configured to generate the absolute priorities for the radio events in a consistent manner across substantially all associated radios.

15. The wireless communications apparatus of claim 10, wherein the processor is further configured to receive event conflict information from the one or more associated radios and to generate one or more configuration parameters based at least in part on the event conflict information.

16. The wireless communications apparatus of claim 15, Wherein the processor is further configured to identify a conflict between a set of events corresponding to the one or more associated radios based on the event conflict information and to instruct modification of at least one of a frequency channel or a radio technology utilized for at least one event associated with the conflict.

17. The wireless communications apparatus of claim 10, wherein:
the memory further stores data relating to one or more upper layer entities; and
the processor is further configured to receive configuration information from the one or more upper layer entities and to generate one or more configuration parameters based at least in part on the configuration information.

18. An apparatus, comprising:
means for obtaining information relating to properties of one or more associated transceivers;
means for generating configuration parameters to be utilized by the one or more associated transceivers for event management based at least in part on the properties of the one or more associated transceivers;
means for generating absolute priorities of events executable by the one or more associated transceivers; and
means for maintaining a set of potential collision events between respective associated transceivers and a set of resolutions corresponding to respective potential collision events according to an absolute priority of each of the respective potential collision events.

19. The apparatus of claim 18, wherein:
the means for obtaining information comprises means for identifying an associated transceiver entering an enabled state from a disabled state; and
the apparatus further comprises means for registering the associated transceiver entering an enabled state.

20. The apparatus of claim 18, wherein:
the means for obtaining information comprises means for determining operating states of the one or more associated transceivers; and
the apparatus further comprises means for configuring a sleep mode of the apparatus based at least in part on the operating states of the one or more associated transceivers.

21. The apparatus of claim 18, wherein the means for generating comprises means for maintaining a database of the potential collision events between respective associated transceivers and respective resolutions corresponding to the potential collision events.

22. The apparatus of claim 21, further comprising means for providing a portion of the database that relates to a given associated transceiver to the given associated transceiver.

23. The apparatus of claim 21, wherein:
the database comprises information relating to the absolute priorities of the events associated with the potential collision events; and
the means for generating further comprises means for applying the absolute priorities to respective events in a consistent manner across substantially all associated transceivers.

24. The apparatus of claim 18, wherein the means for generating comprises:
means for receiving configuration information from one or more upper layer entities; and
means for generating configuration parameters to be utilized by the one or more associated transceivers based at least in part on configuration information received from the one or more upper layer entities.

25. The apparatus of claim 18, wherein the one or more associated transceivers comprise at least one radio.

26. A computer program product, comprising:
a non-transitory computer-readable medium, comprising:
code for causing a computer to obtain information relating to properties of one or more associated radios;
code for causing a computer to generate configuration parameters to be utilized by the one or more associated radios for multi-radio event management based at least in part on the properties of the one or more associated radios;
code for causing a computer to generate absolute priorities of events executable by the one or more associated transceivers; and
code for causing a computer to maintain a set of potential collision events between respective associated radios and a set of resolutions corresponding to respective potential collision events according to an absolute priority of each of the respective potential collision events.

* * * * *